United States Patent
Takahashi et al.

(10) Patent No.: US 11,428,195 B2
(45) Date of Patent: Aug. 30, 2022

(54) INTERNAL COMBUSTION ENGINE

(71) Applicant: KABUSHIKI KAISHA TOYOTA JIDOSHOKKI, Kariya (JP)

(72) Inventors: Noriyoshi Takahashi, Kariya (JP); Koji Momose, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 17/423,556

(22) PCT Filed: Mar. 12, 2020

(86) PCT No.: PCT/JP2020/010691
§ 371 (c)(1),
(2) Date: Jul. 16, 2021

(87) PCT Pub. No.: WO2020/195866
PCT Pub. Date: Oct. 1, 2020

(65) Prior Publication Data
US 2022/0112870 A1 Apr. 14, 2022

(30) Foreign Application Priority Data

Mar. 25, 2019 (JP) .............................. JP2019-056777

(51) Int. Cl.
*F02M 26/19* (2016.01)
*F02M 35/10* (2006.01)
*F02M 26/17* (2016.01)

(52) U.S. Cl.
CPC ...... *F02M 35/10222* (2013.01); *F02M 26/17* (2016.02); *F02M 35/10255* (2013.01)

(58) Field of Classification Search
CPC ....... F02M 35/10222; F02M 35/10255; F02M 26/17
(Continued)

(56) References Cited

U.S. PATENT DOCUMENTS 4,224,912 A * 9/1980 Tanaka .................... F02M 26/63
123/568.2
4,924,840 A * 5/1990 Wade ...................... F02D 21/08
123/568.24

(Continued)

FOREIGN PATENT DOCUMENTS

JP 2000-045880 A 2/2000
JP 2010-222975 A 10/2010
(Continued)

OTHER PUBLICATIONS

International Search Report of PCT/JP2020/010691 dated Jun. 9, 2020 [PCT/ISA/210].
(Continued)

*Primary Examiner* — Phutthiwat Wongwian
*Assistant Examiner* — Arnold Castro
(74) *Attorney, Agent, or Firm* — Sughrue Mion, PLLC

(57) ABSTRACT

A bent section (71) is provided. An intake gas outlet (71B) downstream of the bent section (71) is connected to an intake manifold (11C). A throttle valve (47A) is disposed in the vicinity of and upstream of an intake gas inlet (71A) upstream of the bent section (71). An EGR pipe (13) is connected to the bent section (71). A rotation shaft (48) of the throttle valve (47A) is provided so as to be perpendicular to a first plane (75) including an inlet side intake pipe axis (72A) passing through the intake gas inlet (71A) and an outlet side intake pipe axis (72B) passing through the intake gas outlet (71B). An outer surface, which is intersected by the first plane (75), of the bent section (71) is formed to include a first sidewall surface (73A) extending in parallel to the inlet side intake pipe axis (72A) toward a bent side, a second sidewall surface (73B) extending in parallel to the outlet side intake pipe axis (72B) toward the bent side, and an outer curved surface (73C) having a predetermined radius of curvature configured to connect bent side ends of the first (Continued)

sidewall surface (73A) and the second sidewall surface (73B).

13 Claims, 9 Drawing Sheets

(58) Field of Classification Search
USPC .................................. 123/568.12, 568.17
See application file for complete search history.

(56) References Cited

U.S. PATENT DOCUMENTS

| | | | | |
|---|---|---|---|---|
| 5,056,309 | A * | 10/1991 | Linder | F02M 26/20 |
| | | | | 123/568.17 |
| 5,265,578 | A * | 11/1993 | Zabeck | F02M 26/63 |
| | | | | 123/568.29 |
| 5,562,085 | A * | 10/1996 | Kosuda | F02D 17/02 |
| | | | | 123/568.24 |
| 6,105,559 | A * | 8/2000 | Stoltman | F02M 26/70 |
| | | | | 123/568.19 |
| 7,237,531 | B2 * | 7/2007 | Atkinson | F16K 11/22 |
| | | | | 123/399 |
| 7,267,139 | B2 * | 9/2007 | Blomquist | F02M 26/21 |
| | | | | 123/568.24 |
| 2005/0145230 | A1 * | 7/2005 | Eriksson | F02M 26/64 |
| | | | | 123/568.12 |
| 2007/0074708 | A1 * | 4/2007 | Amano | F02M 25/06 |
| | | | | 123/572 |
| 2008/0141671 | A1 * | 6/2008 | Takemoto | F02M 26/25 |
| | | | | 60/311 |

FOREIGN PATENT DOCUMENTS

| | | |
|---|---|---|
| JP | 2015-132234 A | 7/2015 |
| JP | 2016-183628 A | 10/2016 |
| JP | 2016-188582 A | 11/2016 |

OTHER PUBLICATIONS

International Preliminary Report on Patentability dated Sep. 28, 2021 in International Application No. PCT/JP2020/010691.

* cited by examiner

INTERNAL COMBUSTION ENGINE

CROSS-REFERENCE TO RELATED APPLICATIONS

The present application is a U.S. National Phase entry of, and claims priority to, PCT Application PCT/JP2020/010691, filed Mar. 12, 2020, which claims priority to Japanese Patent Application No. 2019-056777, filed Mar. 25, 2019, both of which are incorporated herein by reference in their entireties for all purposes.

BACKGROUND

The present disclosure relates to an internal combustion engine including an Exhaust Gas Recirculation: EGR.

Various technologies known in the art have been proposed for returning a portion of exhausted gas to an intake pipe via an EGR device. This allows the exhaust gas to be mixed with intake gas and then be fed to the intake manifold. For example, an intake manifold disclosed in Japanese Laid-Open Patent Publication No. 2000-45880 includes a collector formed with a plurality of connection ports to be connected to respective cylinders. The intake manifold also includes a mixing chamber in communication with this collector via a communication port. An intake gas inlet and an EGR gas inlet are connected to one longitudinal end of this mixing chamber. A communication port is provided at the other longitudinal end of the mixing chamber.

The intake gas inlet opens into a longitudinal sidewall of the mixing chamber. A throttle valve is arranged in this intake gas inlet. The rotational axis of the throttle valve extends along the longitudinal direction of the mixing chamber. As a result, the intake gas flows from the intake gas inlet, through the throttle valve, and into the mixing chamber. The intake gas then flows toward the communication port as a swirl stream around a center axis in the longitudinal direction along the sidewall of the mixing chamber. Further, the EGR gas inlet is opened toward the center of this swirl stream. The EGR gas inlet is configured such that the EGR gas is drawn into and mixed in a negative pressure region formed in the center of this swirl stream.

However, since the intake gas flowing from the intake gas inlet into the mixing chamber forms a swirl stream about the longitudinal center of the mixing chamber and since the intake gas flows toward a communication port, the mixing ratio of the EGR gas to the intake gas may possibly vary between the EGR gas drawn into the vicinity of the center axis of the swirl stream and the EGR gas drawn toward the outer periphery of the swirl stream, i.e., to the side of the sidewall of the mixing chamber. This may cause problems, such as that the volume of the EGR gas supplied to each of the cylinders of the internal combustion engine may vary. This variation of volume of the EGR gas may cause fluctuations in the combustion within each of the cylinders, thereby resulting in fluctuations in combustion noise. These fluctuations in combustion noise may give a driver an unpleasant impression.

Accordingly, one aspect of the disclosed technology is to provide an internal combustion engine capable of suppressing fluctuations in combustion noise. This may be done by suppressing variations in the volume of the EGR gas among each of the cylinders and by achieving constant combustions in each of the cylinders.

BRIEF SUMMARY

In order to solve the above described problems, one aspect of the present disclosure relates to an internal combustion engine that includes an intake pipe having a bent section. The internal combustion engine also includes an intake gas outlet downstream of the bent section that is connected to an upstream side of an intake manifold. The internal combustion engine also includes a throttle valve for adjusting an opening of the intake pipe, the throttle valve being disposed upstream of an upstream intake gas inlet located at the bent section and disposed in a vicinity of the intake gas inlet. The internal combustion engine also includes an EGR pipe connected to the bent section. A rotation shaft of the throttle valve is provided so as to be perpendicular to a first plane, the first plane including an inlet side intake pipe axis passing through the intake gas inlet and an outlet side intake pipe axis passing through the intake gas outlet. The bent section includes an outer surface on the first plane. The outer surface is formed to include a first sidewall surface extending from an outer end of the intake gas inlet in parallel to the inlet side intake pipe axis toward a bent side. The outer surface also includes a second sidewall surface extending from an outer end of the intake gas outlet in parallel to the outlet side intake pipe axis toward the bent side. The outer surface also includes an outer curved surface having a predetermined radius of curvature. The outer curved surface is configured to connect bent side ends of the first sidewall surface and the second side wall surface.

According to the above disclosure, the intake gas flows downstream through a gap between both side edges of the throttle valve, in a direction orthogonal to the rotation shaft of the throttle valve, and the intake pipe. The intake gas flows along an outer surface and an inner surface of the bent section once the throttle valve is rotated about the rotation shaft from a position orthogonal to the inlet side intake pipe axis of the intake air inlet by a predetermined angle. Further, the outer surface of the bent section is formed to include a first sidewall surface and a second sidewall surface extending from an outer end of the intake gas inlet and intake gas outlet at the bent section in parallel respectively to the inlet side intake pipe axis and outlet side intake pipe axis. The first and second sidewall surfaces extend toward the bent side on the first plane, the first plane including the inlet side intake pipe axis passing through the intake gas inlet and the outlet side intake pipe axis passing through the intake gas outlet. The outer surface of the bent section also includes the outer curved surface having a predetermined radius of curvature. The outer curved surface is configured to connect the bent side ends of the first sidewall surface and the second sidewall surface.

As a result, as one aspect of the present disclosure, the intake gas flowing along the first sidewall surface upstream of the bent section toward the outer curved surface contains an intake gas that collides this outer curved surface and then flows upstream in a swirling manner. The intake gas flowing along the first sidewall surface upstream of the bent section toward the outer curved surface also contains an intake gas flowing downstream from the outer curved surface in a swirling manner along the second sidewall surface in a direction downstream of the bent section. This intake gas flowing upstream in a swirling manner collides the throttle valve and flows again downstream in a swirling manner along the inner curved surface of the bent section. On the other hand, the intake gas flowing along a pipe wall toward the inner curved surface of the bent section contains an intake gas flowing in a swirling manner along the inner curved surface of the bent section and contains an intake gas flowing from the outer curved surface at the bent section along the second sidewall surface downstream of the bent section in a swirling manner. These swirling flows generate two vortex currents swirling downstream from the intake gas outlet of the bent section in the intake pipe. The two vortex currents swirl in opposite directions from one another across the outlet side intake pipe axis.

As a result, the EGR gas flowing through the connection port of the EGR pipe connected to the bend section is merged with the intake gas that form the two vortex currents. Accordingly, these flows are effectively mixed and flow into the intake manifold. Therefore, since the intake gas is sufficiently mixed with the EGR gas, due to the two vortex currents, and is fed to each of the cylinders via the intake manifold, the variation in volume of the EGR gas among each of the cylinders is reduced. This results in constant combustions in each of the cylinders, thereby suppressing fluctuations in combustion noise.

Next, another aspect of the present disclosure is the internal combustion engine having an inner facing portion of the throttle valve facing the inside the bent section. This inner facing portion is rotated about the rotation shaft from the closed position, the closed position being where the throttle valve is orthogonal to the inlet side intake pipe axis of the intake gas inlet. The inner facing portion is rotated toward a downstream side by a predetermined angle. In contrast, an outer facing portion, which faces the outside the bent section, is rotated about the rotation shaft from the closed position, the closed position being orthogonal to the inlet side intake pipe axis of the intake gas inlet, toward an upstream side by a predetermined angle. Accordingly, the intake gas flows downstream through a gap between both side edges and the intake pipe in a direction orthogonal to the rotation shaft of the throttle valve.

According to the above disclosure, the inner facing portion facing the inside the bent section of the throttle valve is rotated about the rotation shaft from the closed position, which is orthogonal to the inlet side intake pipe axis of the intake gas inlet, toward the downstream side by a predetermined angle. Further, the outer facing portion facing the outside the bent section of the throttle valve is rotated about the rotation shaft from the closed position, which is orthogonal to the inlet side intake pipe axis of the intake gas inlet, toward the upstream side by a predetermined angle. Therefore, a great portion of the intake gas that collided the upstream surface of the throttle valve flows toward the inner curved surface of the bent section. Accordingly, it flows downstream along the gap between the side edge on the side of the inner facing portion of the throttle valve and the intake pipe.

As a result, as one aspect of the present disclosure, the flow velocity of the intake gas flowing along the gap between the side edge on the side of the inner facing portion of the throttle valve and the intake pipe can be increased to a greater extent than the flow velocity of the intake gas flowing along the gap between the side edge on the side of outer facing portion of the throttle valve and the intake pipe. This allows the swirling speed of the two vortex currents generated in the intake pipe downstream from the intake gas outlet of the bend section to be faster than if the inner facing portion of the throttle valve were to be rotated about the rotation shaft from the closed position to the upstream side by a predetermined angle. As a result, the EGR gas flowing into the bend section through the connection port of the EGR pipe is more evenly mixed with the intake gas. The more evenly mixed flows can then be supplied into the intake manifold. Therefore, the variation in volume of the EGR gas among each of the cylinders can be further reduced. This results in more constant combustions in each of the cylinders, thereby suppressing fluctuations in combustion noise.

Next, according to another aspect of the present disclosure, an extension line of the EGR pipe axis passing through a connection port of the EGR pipe is disposed substantially perpendicular to the first plane and on a side of a second plane, the second plane being orthogonal to the first plane and including the outlet side intake pipe axis of the intake gas outlet, opposite to the intake gas inlet. Further, the extension line of the EGR pipe axis is disposed in a position closer to an outer curved surface of the bent section than an intersection point between the inlet side intake pipe axis and the outlet side intake pipe axis on the first plane.

According to the above disclosure, the extension line of the EGR pipe axis passing through the connection port of the EGR pipe is disposed substantially perpendicular to the first plane, the first plane including the inlet side intake pipe axis passing through the intake gas inlet and including the outlet side intake pipe axis passing through the intake gas outlet. The EGR pipe axis is also disposed on a side of the second plane, the second plane being orthogonal to the first plane and including the outlet side intake pipe axis of the intake gas outlet, opposite to the intake gas inlet. Further, the extension line of the EGR pipe axis passing through the connection port of the EGR pipe is disposed in a position closer to the outer curved surface of the bent section than the intersection between the inlet side intake pipe axis and the outlet side intake pipe axis on the first plane.

Therefore, as one aspect of the present disclosure, the EGR gas can be introduced from a lateral direction and in a position close to the outer curved surface. The EGR gas can be introduced into a portion of the intake gas that collides with the outer curved surface of the bent section and flows upstream. As a result, the EGR gas is allowed to flow into the downstream intake pipe at the bent section at front side where the two vortex currents swirling in opposite directions from one another are generated. The EGR gas is also allowed to flow substantially evenly into the intake gas that forms the two vortex currents. As a result, since the EGR gas is substantially evenly merged into the intake gas that forms the two vortex currents, the EGR gas can be further mixed evenly with the intake gas. There more evenly mixed gasses can then be supplied to the intake manifold.

Next, another aspect of the present disclosure relates to an internal combustion engine in that the extension line of the EGR pipe axis passing through the connection port of the EGR pipe is disposed in parallel to the outlet side intake pipe axis of the intake gas outlet and at the bent section on the first plane. The EGR pipe axis is also disposed on a side of the second plane, the second plane being orthogonal to the first plane that includes the outlet side intake pipe axis, opposite to the intake gas inlet.

According to the above disclosure, the extension line of the EGR pipe axis passing through the connection port of the EGR pipe is disposed in parallel to the outlet side intake pipe axis of the intake gas outlet and at the bent section on the first plane, the first plane including the inlet side intake pipe axis passing through the intake gas inlet and including the outlet side intake axis passing through the intake gas outlet. The EGR pipe axis is also disposed on the side of the second plane, the second plane being orthogonal to the first plane and including the outlet side intake pipe axis, opposite to the intake gas inlet. As a result, as one aspect of the present disclosure, the EGR gas is allowed to flow into the downstream intake pipe at the bent section at the front side, where the two vortex currents swirling in opposite directions from one another are generated. The EGR gas is allowed to flow substantially evenly into the intake gas that forms the two vortex currents. As a result, since the EGR gas is substantially evenly merged mixed with the intake gas that forms the two vortex currents, the EGR gas can be further mixed evenly with the intake gas and such a mixture could then be supplied to the intake manifold.

BRIEF DESCRIPTION OF THE DRAWINGS

FIG. 9 is changed.

FIGS. 14(D-1) and 14(D-2) illustrate a second comparative example in which the intake pipe downstream from the bent section is deformed to have a substantially rectangular cross-section.

DETAILED DESCRIPTION

Hereinafter, an internal combustion engine of the present disclosure according to a first and second embodiment will be described in detail with reference to the drawings. First of all, a schematic structure of an internal combustion engine 10 according to the first embodiment of the present disclosure will be described with reference to FIG. 1. In the description of the first embodiment, an example of the internal combustion engine 10 will be described, for example, using a diesel engine installed in a vehicle.

First Embodiment

Figure 1:
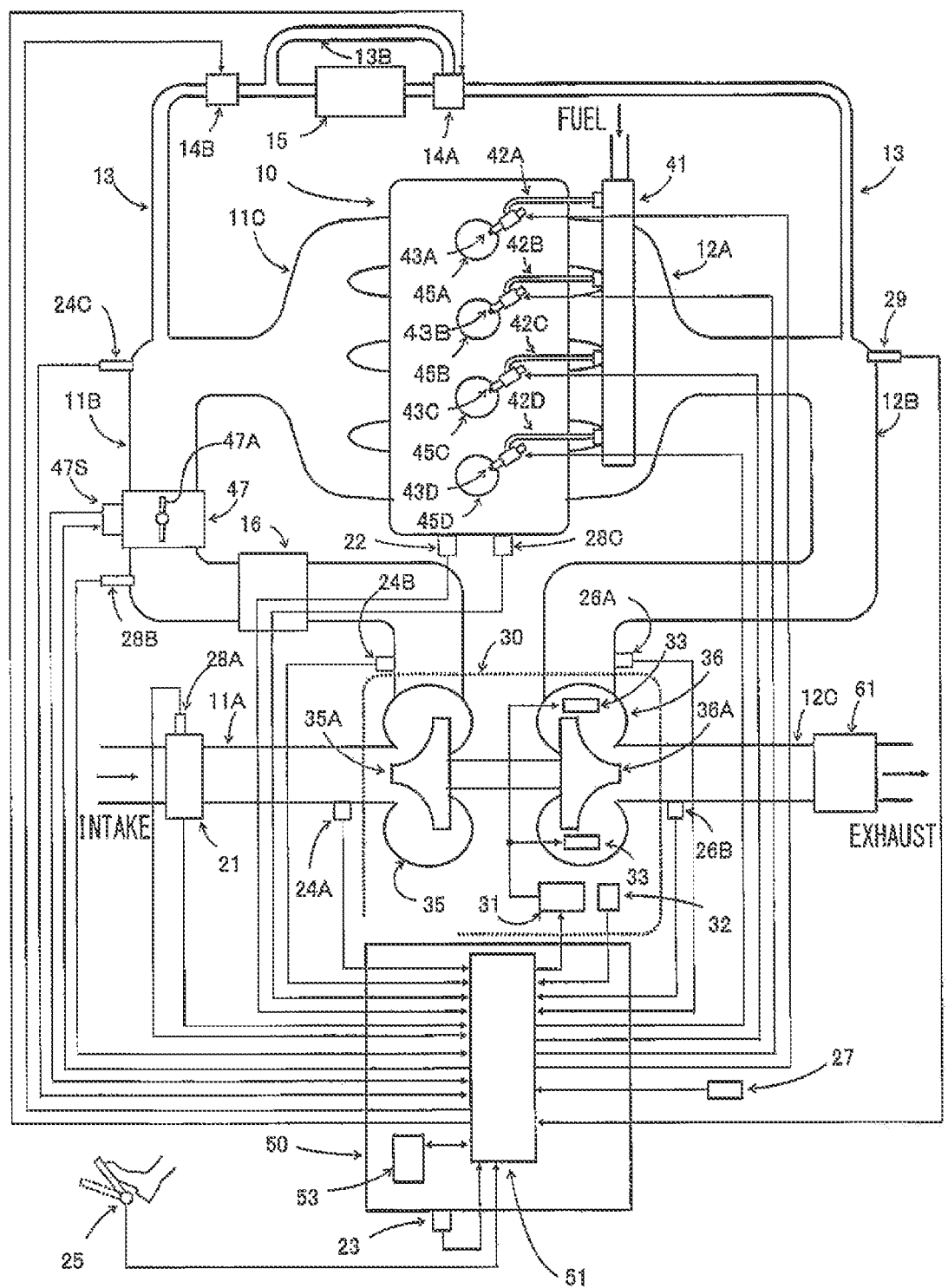
FIG. 1 is a view illustrating a schematic structure of an internal combustion engine according to a first embodiment.

Hereinafter, an internal combustion engine 10 according to the first embodiment will be described in order from an intake side to an exhaust side. As shown in FIG. 1, an intake gas flow rate detector 21 (for example, intake flow rate sensor) is provided on an inlet side of an intake pipe 11A. The intake flow rate detector 21 is configured to output detected signals, which correspond to a flow rate of the gas sucked by the internal combustion engine 10, to a control unit 50. The intake flow rate detector 21 is provided with an intake gas temperature detector 28A (for example, an intake gas temperature sensor). The intake gas temperature detector 28A is configured to output detected signals, which correspond to the temperature of the intake gas passing through the intake flow rate detector 21, to the control unit 50.

An outlet side of the intake pipe 11A is connected to an inlet side of a compressor 35. An outlet side of the compressor 35 is connected to an inlet side of an intake pipe 11B. A turbo supercharger 30 includes the compressor 35 and a turbine 36. The compressor 35 has a compressor impeller 34A. The turbine 36 has a turbine impeller 36A. The compressor impeller 35A is driven to rotate by the turbine impeller 36A, which is driven to rotate by exhausted gas. The compressor 30 supercharges by feeding the intake gas flowing in from the intake pipe 11A to the intake pipe 11B under pressure.

A compressor upstream pressure detector 24A is provided on the intake pipe 11A upstream of the compressor 35. The compressor upstream pressure detector 24A may be, for example, a pressure sensor, which is configured to output a detected signal corresponding to the pressure within the intake pipe 11A upstream of the compressor 35 to the control unit 50. The intake pipe 11B downstream of the compressor 35 (at a location of the intake pipe 11B between the compressor 35 and an intercooler 16) is provided with a compressor downstream pressure detector 24B. The compressor downstream pressure detector 24B may, for example, be a pressure sensor and serves to output a detected signal corresponding to the pressure within the intake pipe 11B downstream of the compressor 35.

The intercooler 16 is disposed at an upstream portion of the intake pipe 11B and a throttle device 47 is disposed downstream of the intercooler 16. The intercooler 16 is disposed downstream of the compressor downstream pressure detector 24B. The intercooler 16 is configured to lower the temperature of the intake gas supercharged by the compressor 35. An intake gas temperature detector 28B (for example, an intake air temperature sensor) may be provided between the intercooler 16 and the throttle device 47. The intake gas temperature detector 28B is configured to output a detected signal to the control unit 50, the signal corresponding to the temperature of the intake gas, which was lowered in temperature by the intercooler 16.

The throttle device 47 drives a throttle valve 47A for adjusting the opening of the intake pipe 11B in accordance with a control signal from the control unit 50. The throttle device 47 is configured to allow the intake flow rate to be adjusted. The control unit 50 is configured to output a control signal to the throttle device 47 in accordance with the detected signal from a throttle opening detector 47S (for example, throttle opening sensor) and in accordance with a target throttle opening amount, so as to adjust the opening of the throttle valve 47A provided at the intake pipe 11B. The control unit 50 determines the target throttle opening amount in accordance with a detected depression amount of an accelerator pedal, which is detected based on the detected signal from an accelerator pedal depression amount detector 25, and an operation condition of the internal combustion engine 10.

The accelerator pedal depression amount detector 25 may be, for example, an accelerator pedal depression angle sensor and may be provided on an accelerator pedal. The control unit 50 can detect the amount a driver has depressed the accelerator pedal based on the detected signal from the accelerator pedal depression amount detector 25.

A pressure detector 24C is provided downstream of the throttle device 47 on the intake pipe 11B. The outlet side of the EGR pipe 13 is connected to downstream of the throttle device 47 on the intake pipe 11B. Further, the outlet side of the intake pipe 11B is connected to the inlet side of the intake manifold 11C, and the outlet side of the intake manifold 11C is connected to the inlet side of the internal combustion engine 10. The pressure detector 24C may be, for example, a pressure sensor, and is configured to output a detected signal corresponding to the pressure of the intake gas before the intake gas flows into the intake manifold 11C. Further, the EGR gas introduced from the inlet side (a part connecting with the exhaust pipe 12B) of the EGR pipe 13 is exhausted from the outlet side (a part connecting with the intake pipe 11B) of the EGR pipe 13 into the intake pipe 11B. A passage defined by the EGR pipe 13 through which the EGR gas flows corresponds to an EGR passage.

The internal combustion engine 10 includes a plurality of cylinders 45A to 45D. Injectors 43A to 43D are provided to respective cylinders 45A to 45D. Fuel is fed to the injectors 43A to 43D through a common rail 41 and fuel pipes 42A to 42D. The injectors 43A to 43D are driven based on a control signal from the control unit 50 and are configured to inject fuel into the respective cylinders 45A to 45D.

The internal combustion engine 10 is provided with a rotation detector 22, a coolant temperature detector 28C, etc. The rotation detector 22 may be, for example, a rotary sensor and may be configured to output a detected signal corresponding to the rotation speed of the crank shaft of the internal combustion engine (i.e., engine speed) to the control unit 50. The coolant temperature detector 28C may be, for example, a temperature sensor and may be configured to detect the temperature of the coolant to be circulated in the internal combustion engine 10. The coolant temperature detector 28C is configured to output the detected signal in accordance with the detected temperature of the coolant to the control unit 50.

The outlet side of the intake manifold 12A is connected to the exhaust side of the internal combustion engine 10. The inlet side of the exhaust pipe 12B is connected to the outlet side of the exhaust manifold 12A. The outlet side of the exhaust pipe 12B is connected to the inlet side of the turbine 36. The outlet side of the turbine 36 is connected to the inlet side of the exhaust pipe 12C.

The inlet side of the EGR pipe 13 is connected to the exhaust pipe 12B. The EGR pipe 13 communicates the exhaust pipe 12B with the intake pipe 11B. The EGR pipe 13 serves to allow a portion of the exhausted gas from the exhaust pipe 12B (corresponding to an exhaust passage) to return to the intake pipe 11B (corresponding to an intake passage). Further, the EGR pipe 13 is provided with a passage switching device 14A, a bypass pipe 13B, an EGR cooler 15, and an EGR valve 14B. A passage defined by the bypass pipe 13B corresponds to a bypass passage.

The passage switching device 14A is a passage switching valve configured to switch the route of the EGR gas flowing to return the EGR gas to the intake pipe 11B through the EGR pipe 13 based on a control signal from the control unit 50. The passage switching device 14A switches the route between flowing through the EGR cooler 15 and bypassing the EGR cooler 15 by using the bypass pipe 13B. The bypass pipe 13B is provided for bypassing the EGR cooler 15. The bypass pipe 13B has its inlet side connected to the passage switching device 14A and its outlet side connected to a portion of the EGR pipe 13 extending between the EGR valve 14B and the EGR cooler 15.

The EGR valve 14B is provided downstream of the EGR cooler 15. The EGR valve 14B is provided downstream of a junction between the EGR pipe 13 and the bypass pipe 13B. The EGR valve 14B adjusts the flow rate of the EGR gas flowing through the EGR pipe 13. The EGR valve 14B does this by adjusting the opening amount of the EGR pipe 13 based on a control signal from the control unit 50.

The EGR cooler 15 is provided at a portion of the EGR pipe 13 extending between the passage switching device 14A and the junction between the EGR pipe 13 and the bypass pipe 13B. The EGR cooler 15 is a so-called heat exchanger, where a coolant for cooling is fed and the introduced EGR gas is cooled and exhausted.

An exhausted gas temperature detector 29 is provided at the exhaust pipe 12B. The exhausted gas temperature detector 29 may be, for example, an exhausted gas temperature sensor that is configured to output a detected signal, which corresponds to the exhausted gas temperature, to the control unit 50. The control unit 50 is capable of estimating the temperature of the EGR gas introduced via the EGR pipe 13, the EGR cooler 15 (or the bypass pipe 13B), and the EGR valve 14B into the intake pipe 11B. This estimation may be based on the exhausted gas temperature detected using the exhausted gas temperature detector 29, a controlled condition of the EGR valve 14B, an operation condition of the internal combustion engine 10, etc.

The outlet side of the exhaust pipe 12B is connected to the inlet side of the turbine 36. The outlet side of the turbine 36 is connected to the inlet side of the exhaust pipe 12C. A variable nozzle 33 is capable of controlling a flow rate of the exhausted gas guided to the turbine impeller 36A. The opening of the variable nozzle 33 is adjusted by a nozzle driver 31. The control unit 50 outputs a control signal to the nozzle driver 31 in accordance with the detected signal from the nozzle opening detector 32 (for example, the nozzle opening sensor) and in accordance with a target nozzle opening amount. The nozzle driver 31 is configured to adjust the opening of the variable nozzle 33.

A turbine upstream pressure detector 26A is provided at the exhaust pipe 12B upstream of the turbine 36. The turbine upstream pressure detector 26A may be, for example, a pressure sensor. The turbine upstream pressure detector 26A is configured to output a detected signal corresponding to the pressure within a portion of the exhaust pipe 12B upstream of the turbine 36 to the control unit 50. A turbine downstream pressure detector 26B is provided at the exhaust pipe 12C downstream of the turbine 36. The turbine downstream pressure detector 26B may be, for example, a pressure sensor. The turbine downstream pressure detector 26B is configured to output a detected signal corresponding to the pressure within a portion of the exhaust pipe 12C downstream of the turbine 36 to the control unit 50.

An exhausted gas purifier 61 is connected to the outlet side of the exhaust pipe 12C. For example, when the internal combustion engine 10 is a diesel engine, the exhausted gas purifier 61 may include an oxidation catalyst, a particulate collection filter, a selective reduction catalyst, etc.

The control unit (ECU: Electronic Control Unit) 50 may include at least a processor 51 (CPU, MPU (Micro-Processing Unit), etc.) and a memory 53 (DRAM, ROM, EEPROM, SRAM, hard disk, etc.). The control unit 50 (ECU) is configured to detect an operation condition of the internal combustion engine 10 based on the detected signals from various detectors, including the above-mentioned detectors. The control unit 50 (ECU) serves to control various actuators, including the injectors 43A to 43D, the EGR valve 14B, the passage switching device 14A, the nozzle driver 31, and the throttle device 47. The detectors used by the control unit 50 for detecting an operation condition shall not be limited to the detectors shown in FIG. 1. The actuators to be controlled by the control unit 50 shall not be limited to the actuators shown in FIG. 1. The memory 53 is configured to store, for example, programs, parameters, etc. for executing various processes.

An atmospheric pressure detector 23 may be, for example, an atmospheric pressure sensor and may be provided in the control unit 50. The atmospheric pressure detector 23 is configured to output a detection signal to the control unit 50 according to the atmospheric pressure around the control unit 50. A vehicle speed detector 27 may be, for example, a vehicle speed detecting sensor and may be installed on a wheel of the vehicle, etc. The vehicle speed detector 27 is configured to output a detected signal corresponding to the rotation speed of the wheels of the vehicle to the control unit 50.

Figure 2:
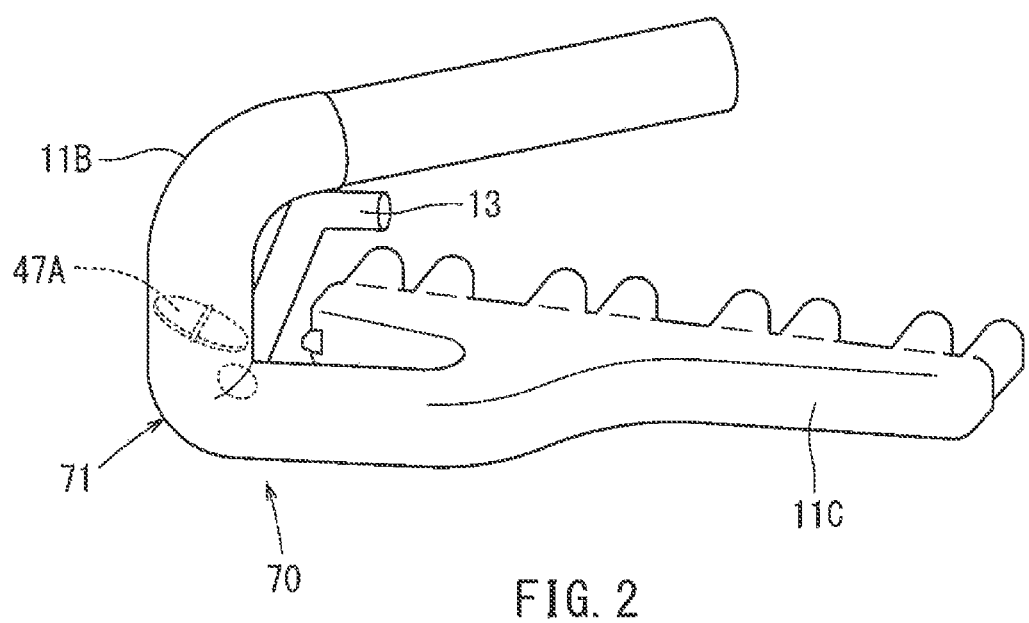
FIG. 2 is a perspective view illustrating an example of a connection structure between an intake pipe and an outlet side of an EGR pipe according to the first embodiment.

Hereinafter, a connection structure 70 between the intercooler 16 and the intake manifold 11C of the internal combustion engine 10 as configured above will be described with reference to FIG. 2 to FIG. 8. As shown in FIG. 2, in the connection structure 70, the outlet side of the EGR pipe 13 is connected at a bent section 71. The bent section 71 is a section where the intake pipe 11B, which may have a substantially circular cross section with a pipe diameter D1 (for example, a pipe diameter of about 55 mm to 65 mm), is bent toward the intake manifold 11C. The bent section 71 is bent at substantially a right angle (e.g., an angle of about 80 degrees to about 95 degrees). The bent section 71 may be bent in a lateral direction from the top, as seen from the side. The intake pipe 11B downstream of the bent section 71 is connected to the upstream side of the intake manifold 11C.

Figure 3:
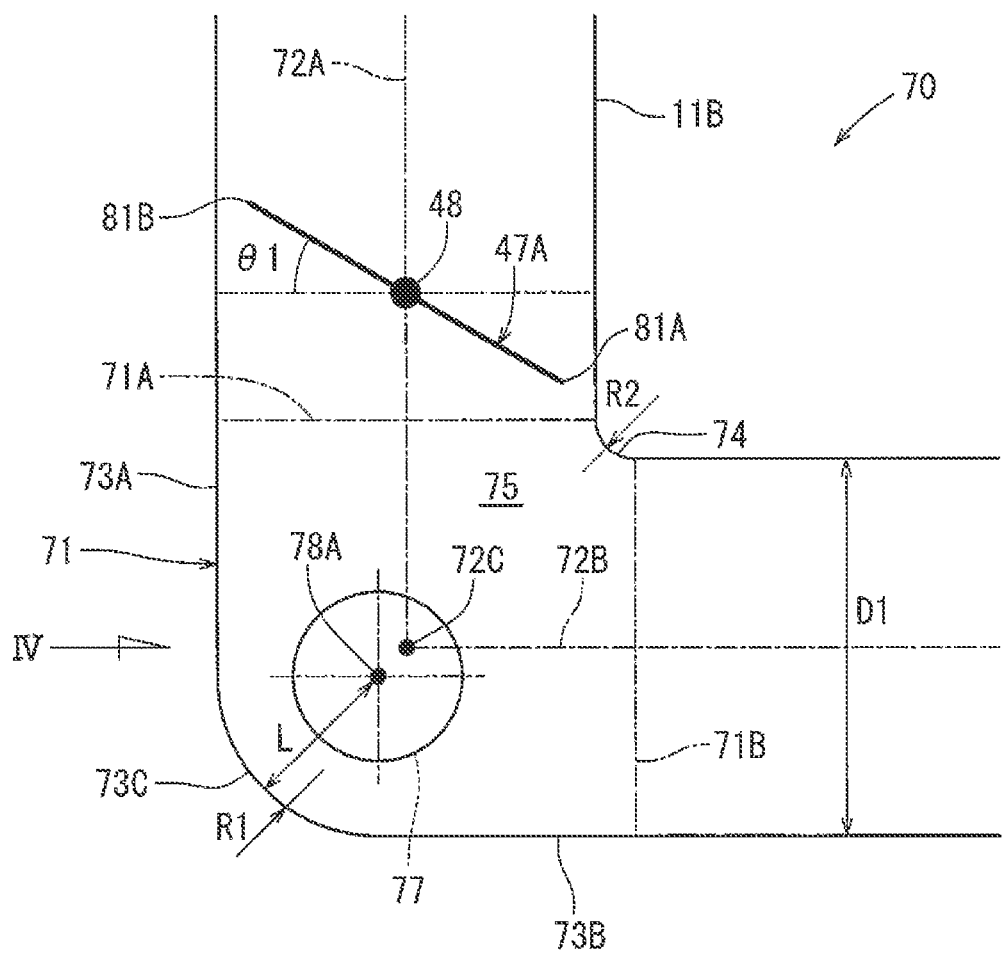
FIG. 3 is a cross-sectional view of a bent section of the intake pipe of FIG. 2, showing an inlet side intake pipe axis and an outlet side intake pipe axis.
Figure 4:
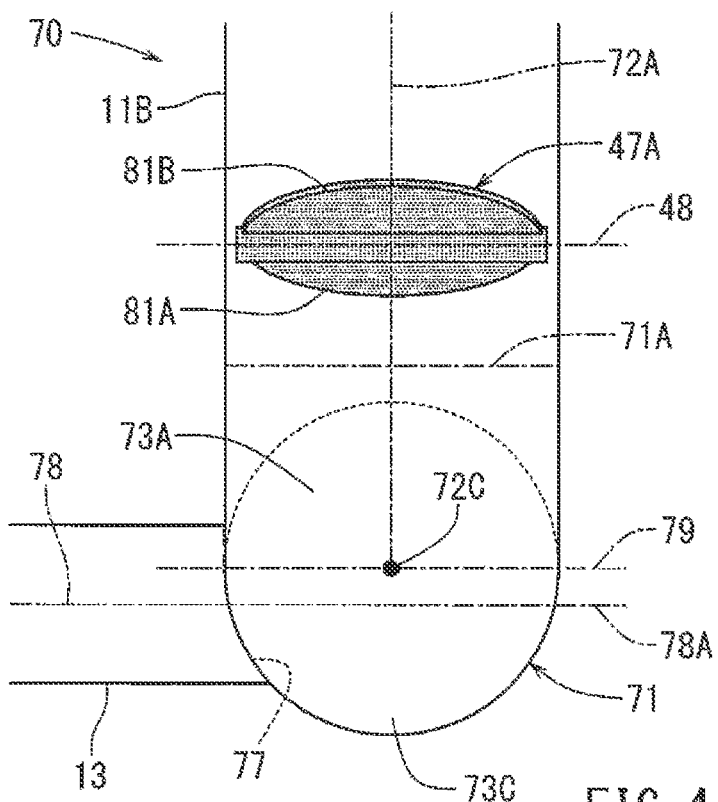
FIG. 4 is a view illustrating an arranged position of a throttle valve and the EGR pipe, as viewed from an arrow IV of FIG. 3.

More specifically, as shown in FIG. 3, the bent section 71 includes an upstream intake gas inlet 71A, through which the intake gas flows into the bent section 71, and a downstream intake gas outlet 71B, through which the intake gas flows out of the bent section 71. As shown in FIG. 3 and FIG. 4, at the bent section 71, an inlet side intake pipe axis 72A passes through the center of a cross section of the upstream intake gas inlet 71A. An outlet side intake pipe axis 72B passes through the center of the cross section of the downstream intake gas outlet 71B. The upstream intake gas inlet 71A and downstream intake gas outlet 71B intersect each other at substantially the center of the bent section 71.

Further, as shown in FIG. 3 and FIG. 4, the throttle valve 47A, which may be substantially circular in a plan view and is capable of adjusting the opening of the intake pipe 11B, is rotatably arranged at a location upstream of the upstream intake gas inlet 71A of the bent section 71. The throttle valve 47A may be in the vicinity of the intake gas inlet 71A. As shown in FIG. 3, a rotation shaft 48 of the throttle valve 47A is provided so as to be perpendicular to a first plane 75. The first plane 75 includes the inlet side intake pipe axis 72A and the outlet side intake pipe axis 72B.

As shown in FIG. 3, on the first plane 75, an outer surface of the bent section 71 is formed to include a first sidewall surface 73A, a second sidewall surface 73B, and an outer curved surface 73C with a first radius of curvature R1 (e.g., radius of curvature of about 42 mm to 30 mm). The outer curved surface 73C connects the bent side ends of the first sidewall surface 73A and the second sidewall surface 73B. The first sidewall surface 73A extends from the outer end of the upstream intake gas inlet 71A to the bent side. The first sidewall surface 73A is substantially parallel to the inlet side intake pipe axis 72A. The second sidewall surface 73B extends from the outer end of the downstream intake gas outlet 71B to the bent side. The second sidewall surface 73B is substantially parallel to the outlet side intake pipe axis 72B. The first radius of curvature R1 corresponds to a predetermined radius of curvature of the present disclosure. Further, on the first plane 75, an inner surface of the bent section 71 is formed to include an inner curved surface 74 with a second radius of curvature R2 (e.g., a radius of curvature of about 3 mm to 7 mm).

Further, as shown in FIG. 3 and FIG. 4, an extension line 78A of the EGR pipe axis 78 passes through a connection port 77 of the EGR pipe 13. The extension line 78A is disposed substantially perpendicular to the first plane 75. The extension line 78A is disposed on a side of a second plane 79 opposite to the intake gas inlet 71A (e.g., see FIG. 4). The second plane 79 is orthogonal to the first plane 45 and includes the outlet side intake pipe axis 72B of the intake gas outlet 71B. Further, the extension line 78A of the EGR pipe axis 78 passing through the connection port 77 of the EGR pipe 13 is located in a position closer to an outer curved surface 73C (see, FIG. 3) than an intersection 72C between the inlet side intake pipe axis 72A and the outlet side intake pipe axis 72B on the first plane 45. Therefore, the extension line 78A of the EGR pipe axis 78 is located below the outlet side intake pipe axis 72B, which extends through the intake gas outlet 71B. The extension line 78A of the EGR pipe axis 78 is located behind (left side in FIG. 3) the intersection 72C point between the inlet side intake pipe axis 72A and the outlet side intake pipe axis 72B.

Further, as shown in FIG. 3 and FIG. 4, the throttle valve 47A is rotated about the rotation shaft 48 by the throttle device 47. The throttle valve 47A may be rotated by a predetermined angle θ1 (e.g., about 20 degrees) from the closed position. The closed position is where an inner facing portion 81A, which faces the inside the bend portion 71, is orthogonal to the inlet side intake pipe axis 72A of the intake gas inlet 71A. When the throttle valve 47A is rotated, the inner facing portion 81A is rotated toward a downstream side. In the closed position, an outer facing portion 81B, which faces the outside the bent section 71, is orthogonal to the inlet side intake pipe axis 72A of the intake gas inlet 71A. When the throttle valve 47A is rotated by the predetermined angle θ1 (e.g., about 20 degrees), the outer facing portion 81B is rotated toward an upstream side. As a result, the intake gas flows downstream through gaps. The gaps are located in the intake pipe 11B and at both side edges in a direction orthogonal to the rotation shaft 48 of the throttle valve 47A (see FIG. 5).

Figure 5:
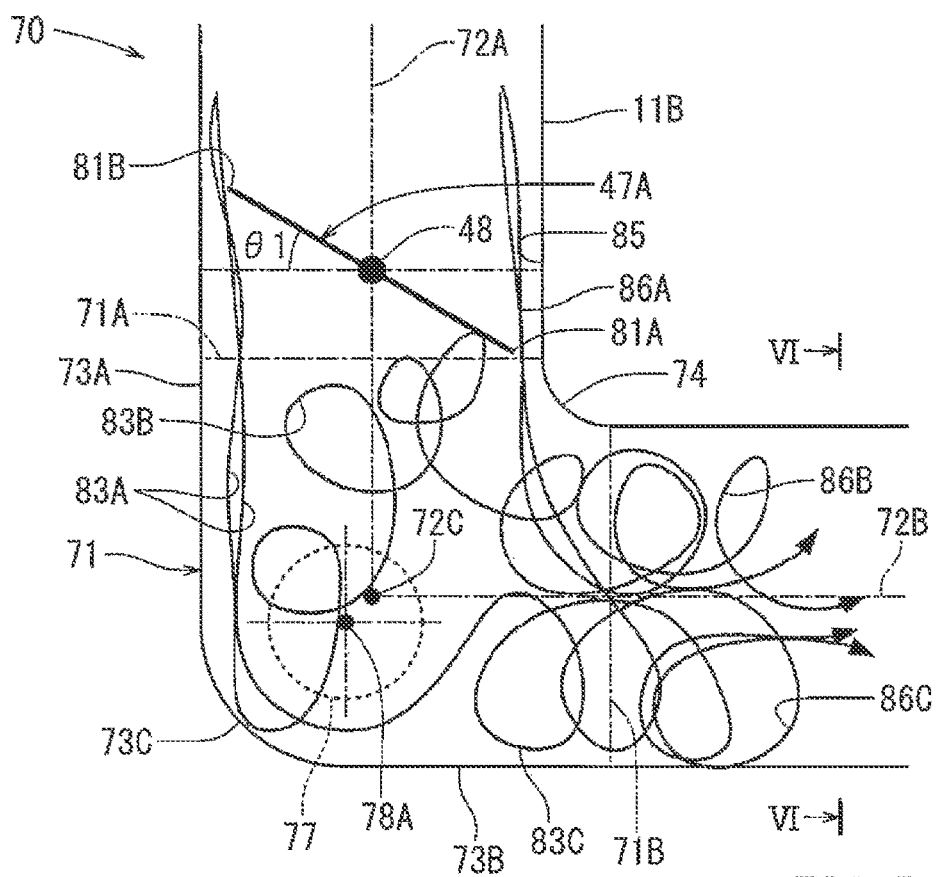
FIG. 5 is a view illustrating generation of two vortex currents at the bent section of the intake pipe of FIG. 3.

Hereinafter, the flow of the intake gas flowing into the bent section 71 will be described with reference to FIG. 5 and FIG. 6. As shown in FIG. 5, the intake gas 83A flowing through the gap between a side edge on the side of the outer facing portion 81B of the throttle valve 47A (side edge on the left side in FIG. 5) and along the first sidewall surface 73A on the upstream side of the bent section 71 contains an intake gas 83B that flows in a swirling manner upstream after having collided with the outer curved surface 73C of the bent section 71. The intake gas 83A flowing past the outer facing portion 81B of the throttle valve 47A also contains an intake gas 83C that flows in a swirling manner downstream after having collided with the outer curved surface 73C and flows along the second sidewall surface 73B on the downstream side of the bent section 71. This intake gas 83B flowing upstream in a swirling manner then collides with the throttle valve 47A. It then flows downstream again in a swirling manner along the inner curved surface 74 of the bent section 71.

On the other hands, an intake gas 86A flowing through the gap between a side edge (right side edge in FIG. 5) on the side of the inner facing portion 81A of the throttle valve 47A and a portion of the intake pipe 11B along a pipe wall 85 flows toward the inner curved surface 74 at the bent section 71. This intake gas 86A includes an intake gas 86B flowing in a swirling manner along the inner curved surface 74 of the bent section 71 and includes an intake gas 86C flowing in a swirling manner along a portion of the second sidewall surface 73B extending from an outer end of the intake gas outlet 71B of the bent section 71.

Figure 6:
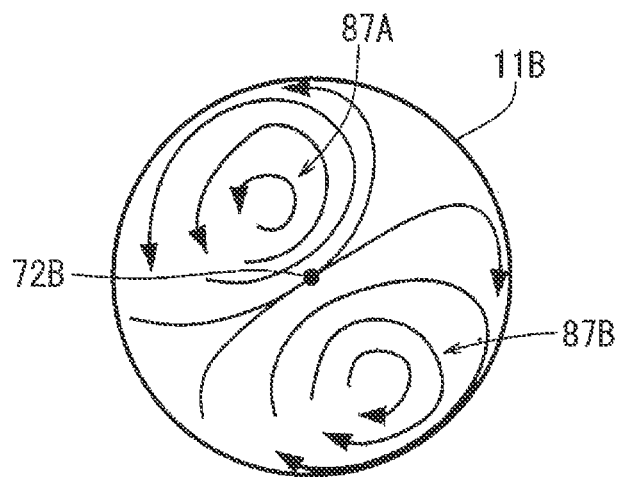
FIG. 6 is a view illustrating an example of the two vortex currents in a cross-section taken along line VI-VI of FIG. 5.

Further, as shown in FIG. 6, these swirling flows of the intake gas 83A to 83C, 86A to 86C, etc. generate two vortex currents 87A, 87B. These two vortex currents 87A, 87B may have substantially the same magnitude swirling in the intake pipe 11B. The two vortex currents 87A, 87B may swirl in opposite directions from one another across the outlet side intake pipe axis 72B as they travel downstream from the intake gas outlet 71B of the bent section 71. For example, the vortex current 87A may swirl in a counterclockwise direction toward the downstream direction while the vortex current 87B may swirl in a clockwise direction toward the downstream direction.

Further, the inner facing portion 81A of the throttle valve 47A is rotated about the rotation shaft 48 from the closed position, which is orthogonal to the inlet side intake pipe axis 72A of the intake gas inlet 71A, to the downstream side by a predetermined angle θ1 (e.g., about 20 degrees). Therefore, a greater portion of the intake gas that collided the upstream surface of the throttle valve 47A flows toward the inner curved surface 74 of the bent section 71 and flows downstream along the gap between the side edge on the side of the inner facing portion 81A of the throttle valve 47A and the intake pipe 11B.

As a result, the flow velocity of the intake gas flowing along the gap between the side edge on the side of the inner facing portion 81A of the throttle valve 47A and the intake pipe 11B can be increased to a greater extent than the flow velocity of the intake gas flowing along the gap between the side edge on the side of outer facing portion 81B of the throttle valve 47A and the intake pipe 11B. This allows the swirling speed of the two vortex currents 87A, 87B, which were generated in the intake pipe 11B downstream from the intake gas outlet 71B of the bend section 71, to be faster than if the side edge on the side of the inner facing portion 81A of the throttle valve 47A were to be rotated about the rotation shaft 48 from the closed position to the upstream side (counterclockwise direction side in FIG. 5) by a predetermined angle θ1 (e.g., about 20 degrees).

As a result, the connection port 77 of the EGR pipe 13 is connected to the bend section 71, and the EGR gas flowing through the connection port 77 and into the bend section 71 is merged with the two vortex currents 87A, 87B of the intake gas. The two vortex currents 87A, 87B are formed in the intake pipe 11B downstream from the intake gas outlet 71B. These flows are effectively mixed and flow into the intake manifold 11C. Therefore, since the intake gas is sufficiently mixed with the EGR gas, due to the two vortex currents 87A, 87B, and since it is fed to each of the cylinders 45A to 45D via the intake manifold 11C, the variation in volume of the EGR gas among each of the cylinders 45A to 45D is reduced. This results in constant combustions in each of the cylinders 45A to 45D, thereby suppressing fluctuations in combustion noise.

Hereinafter, an example of CAE (Computer Aided Engineering) analysis results of the "variation in EGR gas volume among cylinders (%)" will be described with reference to FIG. 7. One of the analysis results is based on the case where the position of the extension line 78A of the EGR pipe axis 78 passing through the connection port 77 of the EGR pipe 13 is located at the intersection 72C between the inlet side intake pipe axis 72A and the outlet side intake pipe axis 72B on the first plane 75 (the intersection 72C is shown in FIG. 3, and the extension line 78A would be co-linear with the intersection 72C for this analysis). Another of the analysis results is based on the case where the position of the extension line 78A is shifted from the intersection 72C to the outer curved surface 73C of the bend section 71 by about 10 mm in the radius of curvature direction.

Here, the pipe diameter D1 (see FIG. 3) of the intake pipe 11B, which has a circular cross-section, is 62 mm. The inlet side intake pipe axis 72A and the outlet side intake pipe axis 72B intersect each other at a right angle on the first plane 75 of the bend section 71. When the extension line 78A is located at the intersection 72C between the inlet side intake pipe axis 72A and the outlet side intake pipe axis 72B, the distance L (see FIG. 3) in the radial direction from the extension line 78A to the outer curved surface 73C is 42 mm.

When the position of the extension line 78A is shifted from the intersection 72C between the inlet side intake pipe axis 72A and the outlet side intake pipe axis 72B toward the outer curved surface 73C by about 10 mm in the radius of curvature direction, the distance L (see FIG. 3) in the radius of curvature direction from the extension line 78A to the outer curved surface 73C is 30 mm. The pipe diameter of the EGR pipe 13 at the connection port 77 is 28 mm. The first radius of curvature R1 of the first curved surface 73C (see FIG. 3) is 30 mm, while the second radius of curvature R2 of the inner curved surface 74 (see FIG. 3) is 5 mm. The inner facing portion 81A of the throttle valve 47A is rotated about the rotation shaft 48 in the downstream direction from the closed position by about 20 degrees.

Here, the "variation in EGR gas volume among cylinders (%)" is the result obtained by dividing the value obtained by subtracting the "minimum volume" from the "maximum volume" of EGR gas supplied among each of the cylinders 45A to 45D by the "average value" of a volume of EGR gas supplied to each of the cylinders 45A to 45D. It is determined that if the "variation in EGR gas volume among cylinders (%)" is less than or equal to the upper limit of "M1" (%), the combustion in each of the cylinders 45A to 45D becomes constant to such an extent that fluctuations in combustion noise can be suppressed. As a result, the driver will not have an unpleasant impression. It is also determined that as the "variation in EGR gas volume among cylinders (%)" became smaller, fluctuations in combustion noise are more suppressed.

Figure 7:
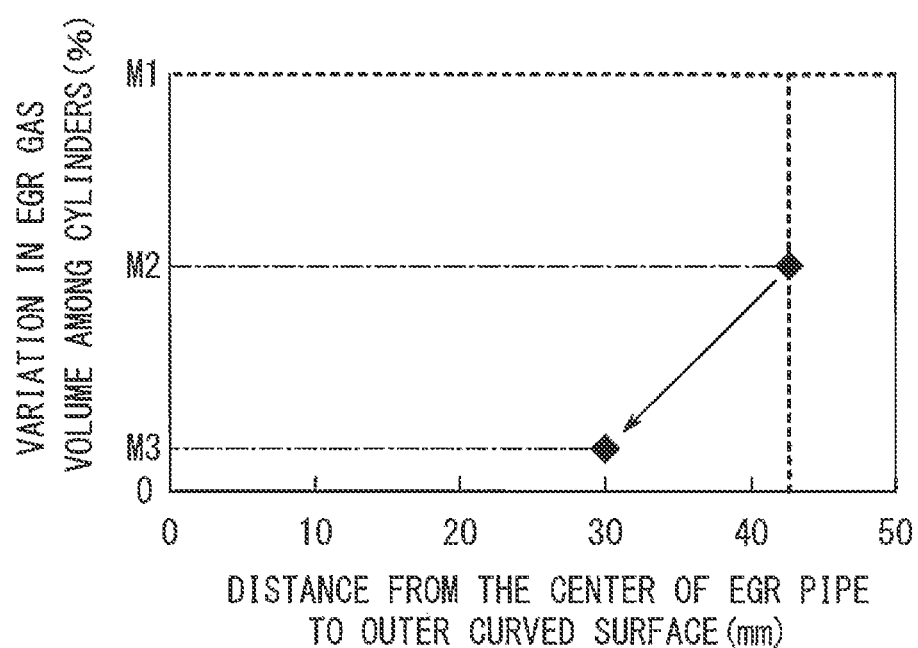
FIG. 7 is a diagram showing an example of the relationship between a distance L from the center of the EGR pipe of FIG. 3 to an outer curved surface and the variation in EGR gas volume among the cylinders.

As shown in FIG. 7, the "variation in EGR gas volume among cylinders (%)" was "M2" (%) when the distance L in the direction of the radius of curvature from the extension line 78A to the outer curved surface 73C was 42 mm, which in this embodiment is when the extension line 78A is located at the intersection 72C point between the inlet side intake pipe axis 72A and the outlet side intake pipe axis 72B. Based on the analysis results, M2<M1×0.6, which means that M2 is smaller than the upper limit "M1" (%). Further, the "variation in EGR gas volume among cylinders (%)" was "M3" (%) when the distance L in the direction of the radius of curvature from the extension line 78A to the outer curved surface 73C was 30 mm, which in this embodiment is when the position of the extension line 78A is shifted by about 10 mm closer to the outer curved surface 73C in the direction of the radius of curvature from the intersection 72C. Based on the analysis results, M3<M1×0.1, which means that M3 is smaller than the "M2" (%).

Therefore, utilizing the device shown in FIG. 3, the EGR gas can be introduced from a lateral direction in a position close to the outer curved surface 73C. The EGR gas is introduced into the intake gas that collided the outer curved surface 73C of the bent section 71 and flows upstream. This is done by locating the position of the extension line 78A of the EGR pipe axis 78 passing through the connection port 77 of the EGR pipe 13 below the intersection 72C between the inlet side intake pipe axis 72A and the outlet side intake pipe axis 72B on the first plane 75, an embodiment of which is shown in FIG. 3. For instance, it is located in a position closer to the outer curved surface 73C than the intersection 72C. As a result, the EGR gas is allowed to flow into the downstream intake pipe 11B at a portion of the bent section 71 located at the front side of where the two vortex currents 87A, 87B (see FIG. 6) swirling in opposite directions from one another are generated.

As a result, the EGR gas may be allowed to flow substantially more evenly into the intake gas that forms the two vortex currents 87A, 87B. Further, since the EGR gas is substantially evenly merged into the intake gas that forms the two vortex currents 87A, 87B, the EGR gas can be further evenly mixed with the intake gas to be supplied to the intake manifold 11C. Consequently, the combustions in each of the cylinders 45A to 45D will be substantially constant, thereby suppressing fluctuations in combustion noise.

Hereinafter, an example of CAE (Computer Aided Engineering) analysis results of the "variation in EGR gas volume among cylinders (%)" will be described with reference to FIG. 8. The analysis results are for cases where the first radius of curvature R1 of the outer curved surface at the bent section 71 is set to be "0.9 times," "0.54 times," and "0.5 times" of the pipe diameter D1 of the intake pipe 11B along the first plane 75, the first plane 75 being shown in FIG. 3.

Here, the pipe diameter D1 (see FIG. 3) of the intake pipe 11B, which has a circular cross-section, is 62 mm. The inlet side intake pipe axis 72A perpendicularly intersects the outlet side intake pipe axis 72B along the first plane 75 of the bent section 71. The position of the extension line 78A is located at the intersection 72C between the inlet side intake pipe axis 72A and the outlet side intake pipe axis 72B. The distance L (see FIG. 3) in the direction of the radius of curvature from the extension line 78A to the outer curved surface 73C is 40 mm.

The pipe diameter of the EGR pipe 13 at the connection port 77 is 28 mm. The first radius of curvature R1 of the outer curved surface 73C (see FIG. 3) is set to be "0.9 times," "0.54 times," and "0.5 times" of the pipe diameter D1 of the intake pipe 11B, namely, "55.8 mm," "33.5 mm," and "31 mm," respectively. The second radius of curvature R2 of the inner curved surface 74 (see FIG. 3) for all samples is 5 mm. The inner facing portion 81A of the throttle valve 47A is rotated about the rotation shaft 48 from the closed position toward the downstream side by about 20 degrees.

Figure 8:
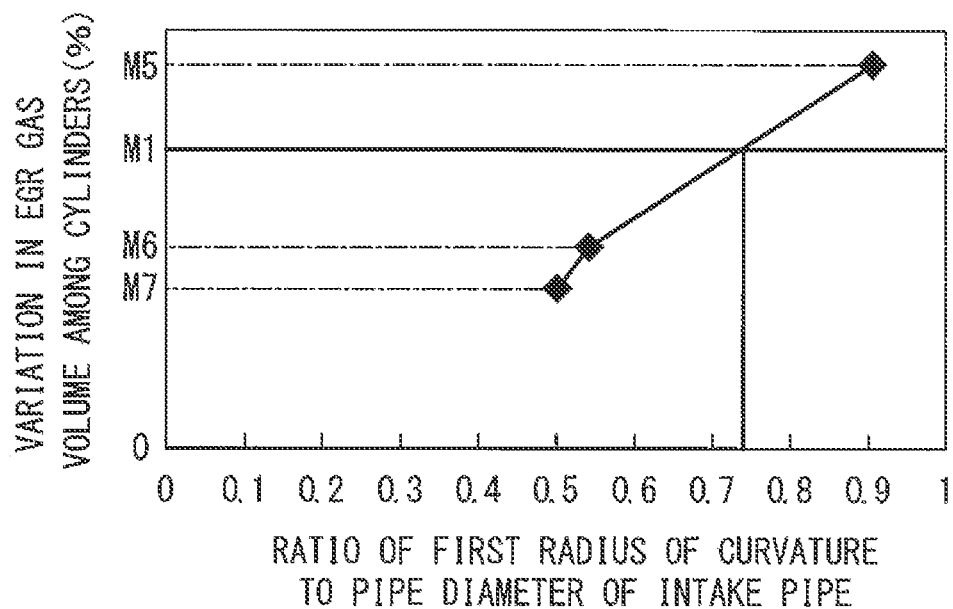
FIG. 8 is a diagram showing an example of the relationship between the ratio of the first radius of curvature of the outer curved surface to the pipe diameter of the intake pipe of FIG. 3 and the variation in EGR gas volume among the cylinders.

As shown in FIG. 8, the "variation in EGR gas volume among cylinders (%)" was "M5" (%) when the first radius of curvature R1 of the outer curved surface 73C (see FIG. 3) was set to be "0.9 times" of the pipe diameter D1 of the intake pipe 11B, namely, "55.8 mm." For this analysis result, M5>M1×1.3, which means that M5 is greater than the upper limit of "M1" (%). Further, the "variation in EGR gas volume among cylinders (%)" was "M6" (%) when the first radius of curvature R1 of the outer curved surface 73C (see FIG. 3) was set to be "0.54 times" of the pipe diameter D1 of the intake pipe 11B, namely, "33.5 mm." For this analysis result, M6<M1×0.7, which means that M6 is smaller than the upper limit of "M1" (%). Furthermore, the "variation in EGR gas volume among cylinders (%)" was "M7" (%) when the first radius of curvature R1 of the outer curved surface 73C (see FIG. 3) was set to be "0.5 times" of the pipe diameter D1 of the intake pipe 11B, namely, "31 mm." For this analysis result, M7<M1×0.5, which means that M7 is smaller than "M6" (%).

In view of the above, as shown in FIG. 8, the first radius of curvature of the outer curved surface 73C (see FIG. 3) may be set to be "less than or equal to 0.73 times" of the pipe diameter D1 of the intake pipe 11B, namely, "smaller than or equal to 45.3 mm," when the "variation in EGR gas volume among cylinders (%)" should be smaller than or equal to the upper limit "M1" (%). Therefore, the volume of the intake gas 83B that collides against the outer curved surface 73C and subsequently flows upstream in a swirling manner (see FIG. 5) can be decreased by setting the first radius of curvature R1 of the outer curved surface 73C at the bent section 71 to have a ratio of "greater than or equal to 0.73" with respect to the pipe diameter D1 of the upstream intake gas inlet 71A at the bent section 71. As a result, the two vortex currents 87A, 87B (see FIG. 6) that are generated in the intake pipe 11B downstream of the bent section 71 that swirl in opposite directions from one another may be made to have almost the same magnitude.

The EGR gas flowing into the bent section 71 through the connection port 77 of the EGR pipe 13 is thus substantially evenly merged into the intake gas that forms the two vortex currents 87A, 87B (see FIG. 6). Accordingly, the flows are efficiently mixed and flows into the intake manifold 11C. Therefore, the intake gas is sufficiently mixed with the EGR gas due to the two vortex currents 87A, 87B (see FIG. 6). The sufficiently mixed gasses are supplied to each of the cylinders 45A to 45D via the intake manifold 11C. As a result, the variation in volume of the EGR gas among each of the cylinders 45A to 45D is reduced, resulting in constant combustions in each of the cylinders 45A to 45D. Therefore, fluctuations in combustion noise are suppressed.

Second Embodiment

Hereinafter, a connection structure 90 between the intake pipe 11B and the outlet side of the EGR pipe 13 according to a second embodiment will be described with reference to FIG. 9 to FIG. 12. In the following description, the same reference numerals used for the structures, etc., of the internal combustion engine 10 according to the second embodiment represent substantially the same or equivalent parts as those of the structure of the internal combustion engine 10 according to the first embodiment.

The connection structure 90 between the intake pipe 11B and the outlet side of the EGR pipe 13 according to the second embodiment is substantially the same as the connection structure 70 between the intake pipe 11B and the outlet side of the EGR pipe 13 according to the first embodiment. However, the connection structure 90 between the intake pipe 11B and the outlet side of the EGR pipe 13 according to the second embodiment differs in a connection position of the outlet side of the EGR pipe 13 to the bend section 71 of the intake pipe 11B, as shown in FIG. 9 and FIG. 10.

Figure 9:
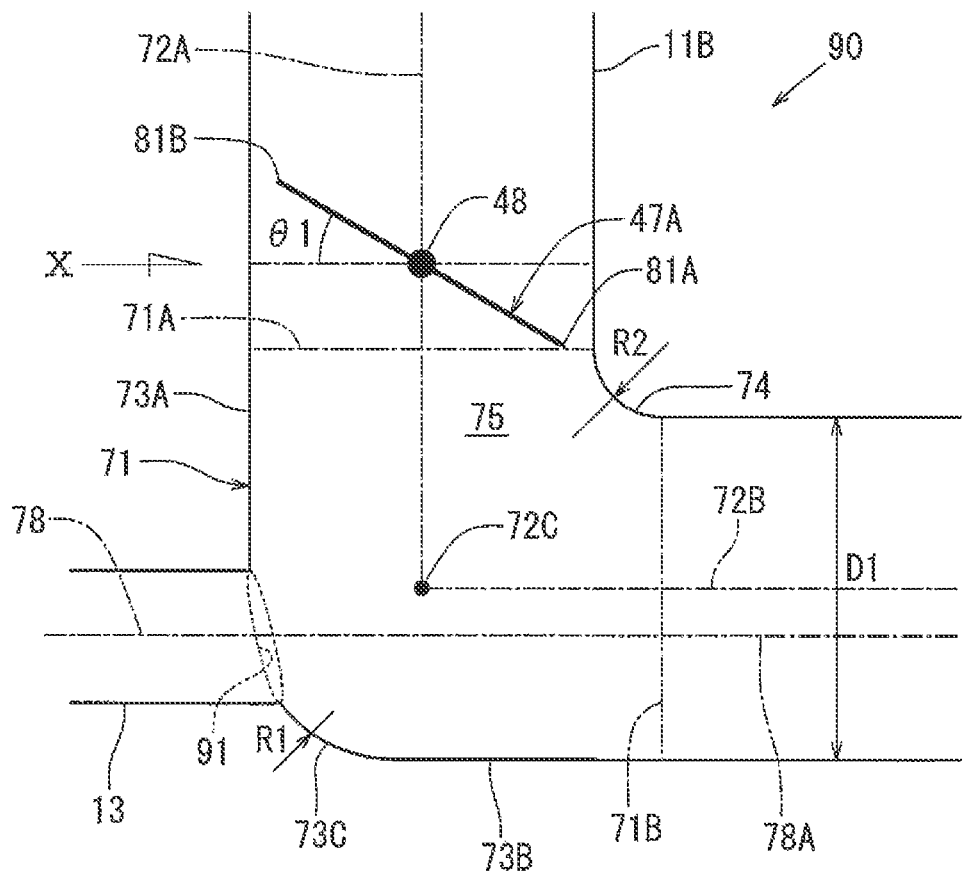
FIG. 9 is a view illustrating a cross section of the connection structure between the intake pipe and an outlet side of the EGR pipe according to a second embodiment. The view includes the inlet side intake pipe axis and the outlet side intake pipe axis.
Figure 10:
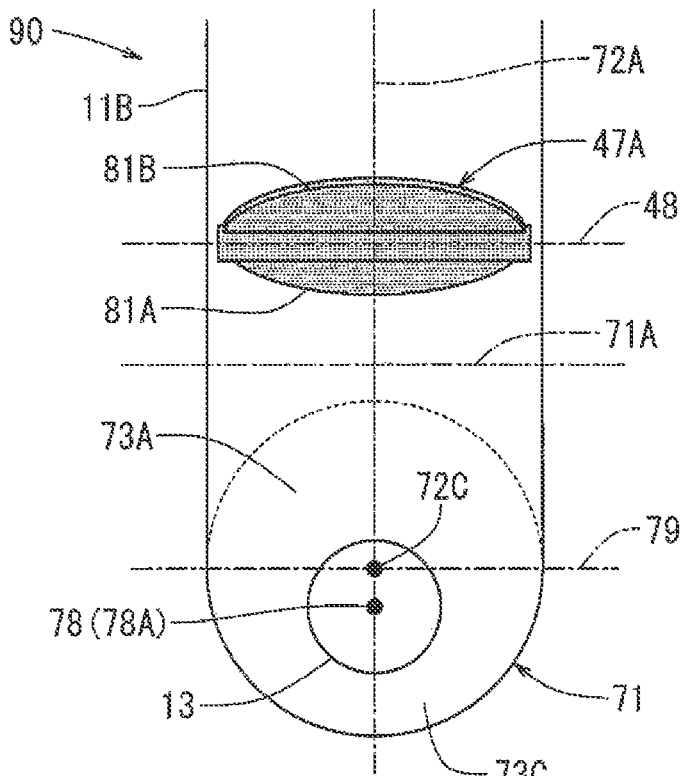
FIG. 10 is a view illustrating arrangement positions of the throttle valve and the EGR pipe, as viewed from an arrow X of FIG. 9.

As shown in FIG. 9 and FIG. 10, the extension line 78A of the EGR pipe axis 78 through a connection port 91 of the EGR pipe 13 is disposed in parallel to the outlet side intake pipe axis 72B of the intake gas outlet 71B at the bent section 71 on the first plane 75. The extension line 78A of the EGR pipe axis is also disposed on the side of the second plane 79 (see FIG. 10), the second plane 79 being orthogonal to the first plane 75 and including the outlet side intake pipe axis 72B through the intake air outlet 71B, opposite to the intake gas inlet 71A. Therefore, the extension line 78A of the EGR pipe axis 78 is disposed below the outlet side intake pipe axis 72B passing through the intake gas outlet 71B in FIG. 9. Further, the connection port 91 of the EGR pipe 13 is connected to the first sidewall surface 73A facing the intake gas outlet 71B of the bent section 71 and connected to the outer curved surface 73C.

Further, the inner facing portion 81A of the throttle valve 47A facing the inside the bent section 71 is rotated about the rotation shaft 48 by the throttle device 47 toward the downstream side, from the closed position orthogonal to the inlet side intake pipe axis 72A of the intake gas inlet 71A, by a predetermined angle θ1 (e.g., about 20 degrees). Therefore, the outer facing portion 81B of the throttle valve 47A facing the outside the bent section 71 is rotated about the rotation shaft 48 by the throttle device 47 toward the upstream side, from the closed position orthogonal to the inlet side intake pipe axis 72A of the intake gas inlet 71A, by a predetermined angle θ1 (e.g., about 20 degrees). The intake gas thus flows toward the downstream side through the gap in a direction orthogonal to the rotation shaft 48 of the throttle valve 47A. The gap is formed at the side edges of the throttle valve 47A and in the intake pipe 11B (see FIG. 11).

Figure 11:
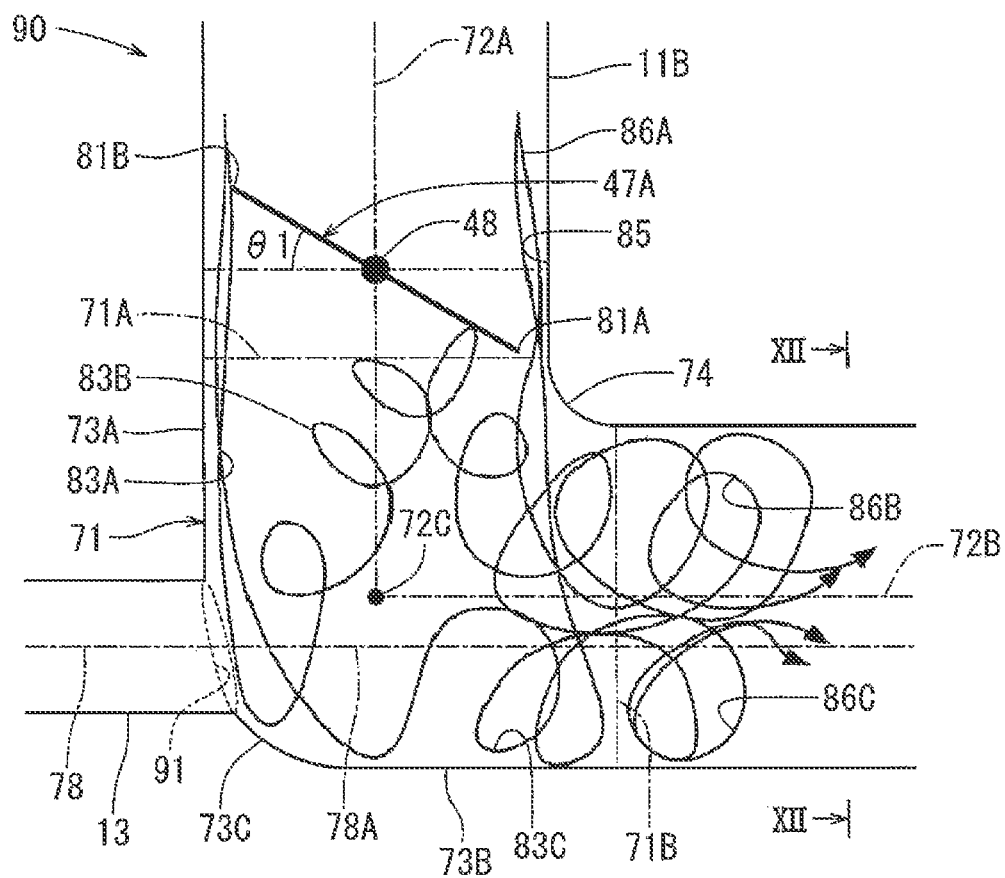
FIG. 11 is a view illustrating generation of two vortex currents at the bent section of the intake pipe of FIG. 9.

Hereinafter, the flow of the intake gas flowing into the bent section 71 will be described with reference to FIG. 11 and FIG. 12. As shown in FIG. 11, the intake gas 83A flows through the gap between the side edge of the throttle valve 47A on the side of the outer facing portion 81B of the throttle valve 47A (side edge on the left side in FIG. 11) and along the first sidewall surface 73A on the upstream side of the bent section 71. The intake gas 83A flows toward the outer curved surface 73C. The intake gas 83A contains an intake gas 83B that collides against this outer curved surface 73C and that then flows upstream in a swirling manner. The intake gas 83A also contains an intake gas 83C that flows in a swirling manner downstream from the outer curved surface 73C and along the second sidewall surface 73B on the downstream side of the bent section 71. This intake gas 83B flowing upstream in a swirling manner collides against the throttle valve 47A and then flows downstream again in a swirling manner along the inner curved surface 74 of the bent section 71.

On the other hands, an intake gas 86A flows through the gap between the side edge (right side edge in FIG. 11) of the throttle valve 47A on the side of the inner facing portion 81A of the throttle valve 47A and the intake pipe 11B. This intake gas 86A flows along the pipe wall 85 toward the inner curved surface 74 at the bent section 71. The intake gas 86A includes an intake gas 86B flowing in a swirling manner along the inner curved surface 74 of the bent section 71. The intake gas 86A also includes an intake gas 86C flowing in a swirling manner along the second sidewall surface 73B extending from the outer end of the intake gas outlet 71B of the bent section 71.

Figure 12:
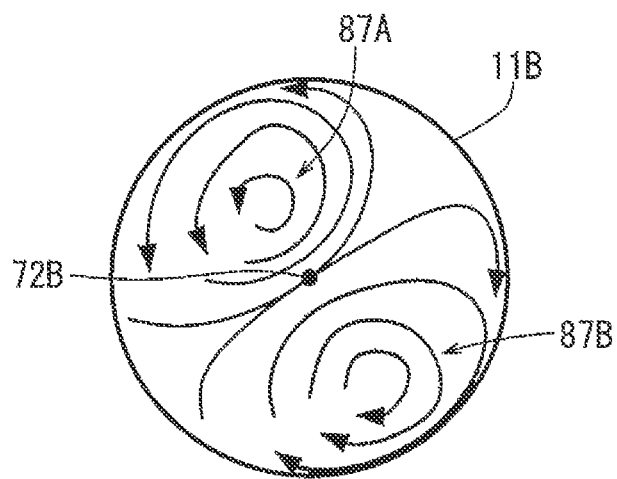
FIG. 12 is a view illustrating an example of the two vortex currents in a cross section taken along line XII-XII of FIG. 11.

Further, as shown in FIG. 12, these swirling flows of the intake gas 83A to 83C, 86A to 86C, etc. generate two vortex currents 87A, 87B of substantially the same magnitude. These two vortex currents 87A, 87B swirl in the intake pipe 11B in opposite directions from one another across the outlet side intake pipe axis 72B downstream from the intake gas outlet 71B of the bent section 71. For example, one vortex current 87A may swirl in the counterclockwise direction toward the downstream direction while the other vortex current 87B may swirl in the clockwise direction toward the downstream direction.

Further, the inner facing portion 81A of the throttle valve 47A is rotated about the rotation shaft 48 from the closed position, the closed position being orthogonal to the inlet side intake pipe axis 72A of the intake gas inlet 71A, toward the downstream side by a predetermined angle θ1 (e.g., about 20 degrees). Therefore, a greater portion of the intake gas that collided against the upstream surface of the throttle valve 47A flows toward the inner curved surface 74 of the bend section 71. Accordingly, a greater portion of the intake gas flows downstream along the gap between the side edge of the throttle valve 47A on the side of the inner facing portion 81A of the throttle valve 47A and the intake pipe 11B.

As a result, the flow velocity of the intake gas flowing along the gap between the side edge on the side of the inner facing portion 81A of the throttle valve 47A and the intake pipe 11B can be increased to a greater extent than the flow velocity of the intake gas flowing along the gap between the side edge on the side of outer facing portion 81B of the throttle valve 47A and the intake pipe 11B. This allows the swirling speed of the two vortex currents 87A, 87B generated in the intake pipe 11B downstream from the intake gas outlet 71B of the bend section 71 to be faster than would be the case if the throttle valve 47A were to be rotated about the rotation shaft 48 from the closed position to the opposite side (counterclockwise direction side in FIG. 11) by a predetermined angle θ1 (e.g., about 20 degrees) (see (A-1) in FIG. 13).

As a result, the EGR gas flowing into the intake air outlet 71B side from the connection port 91 of the EGR pipe 13, which is connected to the bend section 71, is merged in the two vortex currents 87A, 87B of the intake gas formed in the intake pipe 11B downstream from the intake gas outlet 71B. Accordingly, the EGR gas flowing from the connection port 91 is effectively mixed with the intake gas and flows into the intake manifold 11C. Therefore, since the intake gas is sufficiently mixed with the EGR gas due to the two vortex currents 87A, 87B and is fed to each of the cylinders 45A to 45D via the intake manifold 11C, the variation in volume of the EGR gas among each of the cylinders 45A to 45D is reduced. This results in constant combustions in each of the cylinders 45A to 45D, thereby suppressing fluctuations in combustion noise.

One Example of CAE Analysis Results of Variation in EGR Gas Volume Among Cylinders Hereinafter, one example of CAE (Computer Aided Engineering) analysis results of the "variation in EGR gas volume among cylinders (%)" will be described with reference to FIG. 13 and FIG. 16 for the connection structure 70 between the intake pipe 11B and the outlet side of the EGR pipe 13 according to the first embodiment and for the connection structure 90 between the intake pipe 11B and the outlet side of the EGR pipe 13 according to the second embodiment.

Figure 13:
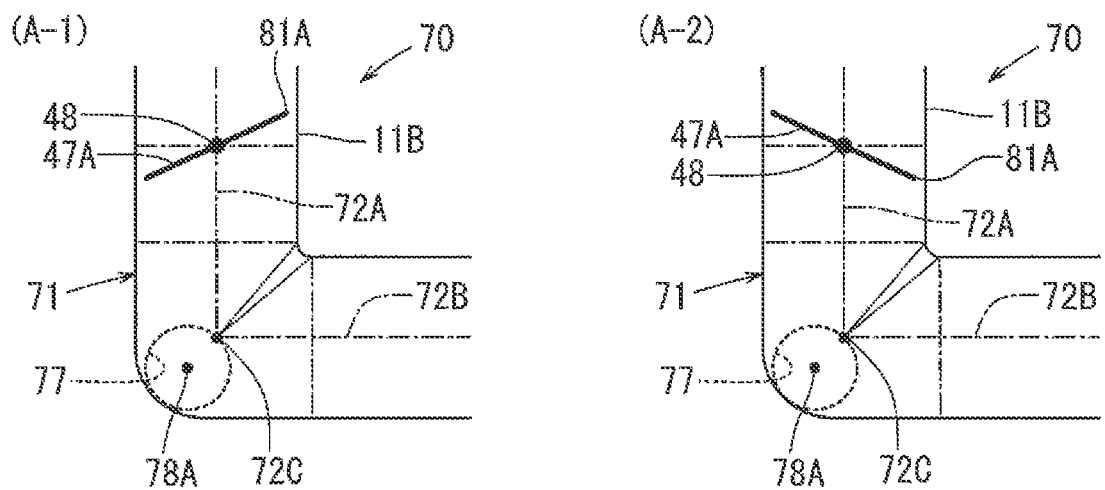
FIGS. 13(A-1), 13(A-2), 13(B-1), and 13(B-2) are views illustrating an example of a state in which a rotation direction of the throttle valve in FIG. 3
Figure 13:
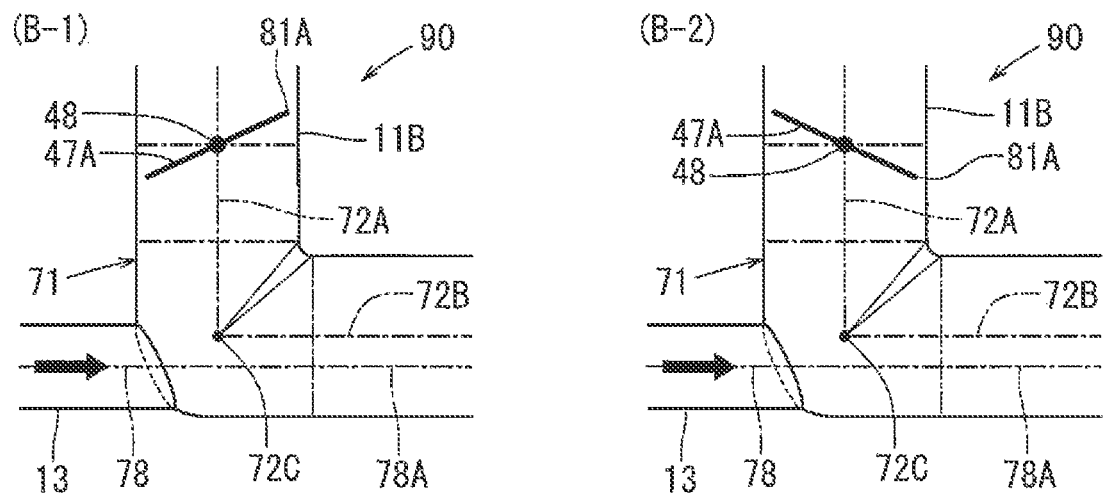
Figure 16:
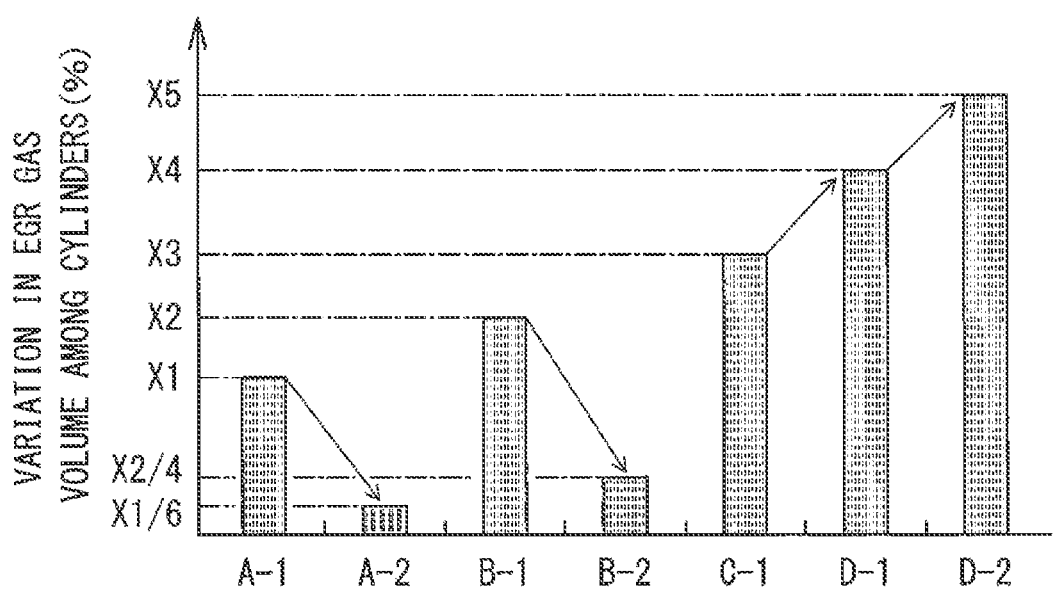
FIG. 16 is a diagram illustrating an example of analysis results of the variation in EGR gas volume among the cylinders, based on the combination of the connection structures between the intake gas pipe and the EGR pipe shown in FIG. 13 and FIG. 14 and the rotated state of the throttle valve.

"A-1" in FIG. 16 represents the CAE analysis result of the variation in EGR gas volume among the cylinders when the throttle valve 47A of the connection structure 70 is rotated in the direction illustrated in FIG. 13(A-1). "A-2" in FIG. 16 represents the CAE analysis result of the variation in EGR gas volume among the cylinders when the throttle valve 47A of the connection structure 70 is rotated in the direction illustrated in FIG. 13(A-2). "B-1" in FIG. 16 represents the CAE analysis result of the variation in EGR gas volume among the cylinders when the throttle valve 47A of the connection structure 90 is rotated in the direction illustrated in FIG. 13(B-1). "B-2" in FIG. 16 represents the CAE analysis result of the variation in EGR gas volume among the cylinders when the throttle valve 47A of the connection structure 90 is rotated in the direction illustrated in FIG. 13(B-2).

As "A-1" in FIG. 16 shows, the variation in EGR gas volume among the cylinders was "X1" (%) when the inner facing portion 81A side of the throttle valve 47A of the connection structure 70 was rotated about the rotation shaft 48 from the closed position toward the upstream side by an angle θ1 (e.g., about 20 degrees). As "A-2" in FIG. 16 shows, the variation in EGR gas volume among the cylinders was "X1/6" (%) when the inner facing portion 81A side of the throttle valve 47A of the connection structure 70 was rotated about the rotation shaft 48 from the closed position toward the downstream side by an angle θ1 (e.g., about 20 degrees).

As "B-1" in FIG. 16 shows, the variation in EGR gas volume among the cylinders was "X2" (%) (where X2>X1) when the inner facing portion 81A side of the throttle valve 47A of the connection structure 90 was rotated about the rotation shaft 48 from the closed position toward the upstream side by an angle θ1 (e.g., about 20 degrees). As "B-2" in FIG. 16 shows, the variation in EGR gas volume among the cylinders was "X2/4" (%) (where X2/4>X1/6), when the inner facing portion 81A side of the throttle valve 47A of the connection structure 90 was rotated about the rotation shaft 48 from the closed position toward the downstream side by an angle θ1 (e.g., about 20 degrees).

Therefore, the "variation in EGR gas volume among cylinders (%)" can be more significantly reduced in each of the connection structures 70, 90 between the intake pipe 11B and the outlet side of the EGR pipe 13 by rotating the inner facing portion 81A side of the throttle valve 47A from the closed position toward the downstream side by a predetermined angle θ1 (e.g., about 20 degrees). This is especially the case as compared to if the inner facing portion 81A side of the throttle valve 47A were to be rotated from the closed position toward the upstream side by a predetermined angle θ1 (e.g., about 20 degrees).

In other words, it was determined that the swirling speed of the two vortex currents 87A, 87B generated in the intake pipe 11B downstream from the intake gas outlet 71B of the bend section 71 is increased by rotating the inner facing portion 81A side of the throttle valve 47A about the rotation shaft 78 from the closed position toward the downstream side by a predetermined angle θ1 (e.g., about 20 degrees). Accordingly, the intake gas is sufficiently mixed with the EGR gas and may be supplied to each of the cylinders 45A to 45D via the intake manifold 11C. As a result, it was discovered that the variation in volume of the EGR gas among each of the cylinders 45A to 45D is reduced, resulting in substantially constant combustions in each of the cylinders 45A to 45D. Accordingly, fluctuations in combustion noise may be dramatically suppressed.

Further, as for the connection structures between the intake pipe 11B and the outlet side of the EGR pipe 13, it was determined that the "variation in EGR gas volume among cylinders (%)" can be reduced more with the connection structure 70 in which the extension line 78A of the EGR pipe axis 78 is disposed to be orthogonal to the outlet side intake pipe axis 72B than with the connecting structure 90 in which the extension line 78A of the EGR pipe axis 78 is disposed to be parallel to the outlet side intake pipe axis 72B.

In other words, it was determined that utilizing the connection structure 70 more effectively mixes the EGR gas flowing into the bent section 71 through the connection port 77 of the EGR pipe 13 with the intake gas that forms the two vortex currents 87A, 87B (see FIG. 6), than when the connection structure 90 is adopted. The connection structure 70 is formed between the intake pipe 11B and the outlet side of the EGR pipe 13. The EGR gas is supplied to each of the cylinders 45A to 45D via the intake manifold 11C. As a result, it was discovered that the connection structure 70 can suppress the variation in volume of the EGR gas among each of the cylinders 45A to 45D, achieve constant combustions in each of the cylinder 45A to 45D, and suppress the fluctuations in combustion noise to a greater extent than the other connection structure 90.

FIRST COMPARATIVE EXAMPLE

Figure 14:
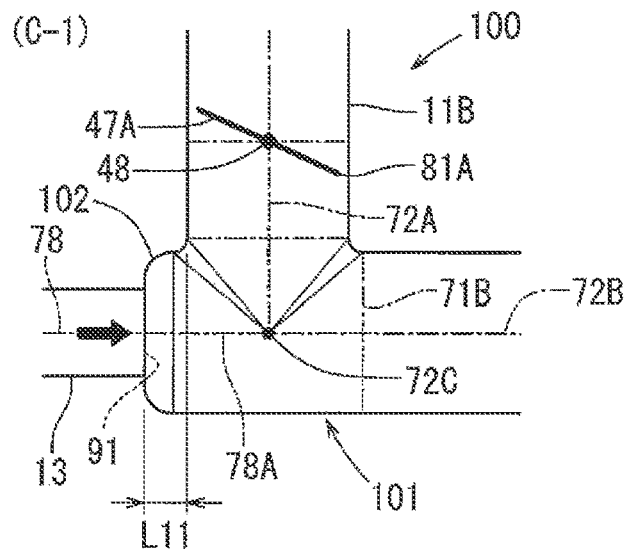
FIG. 14(C-1) is a view illustrating a first comparative example in which an outer surface at the bent section of the intake pipe of FIG. 9 is bulged in a direction of the outlet side intake pipe axis through the intake gas outlet.
Figure 14:
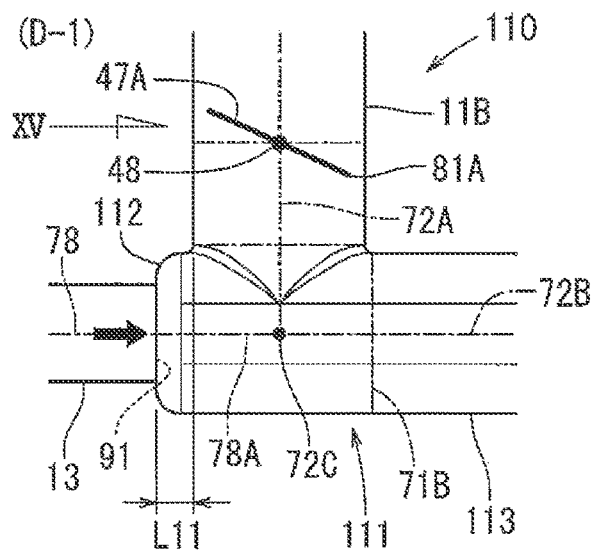
Figure 14:
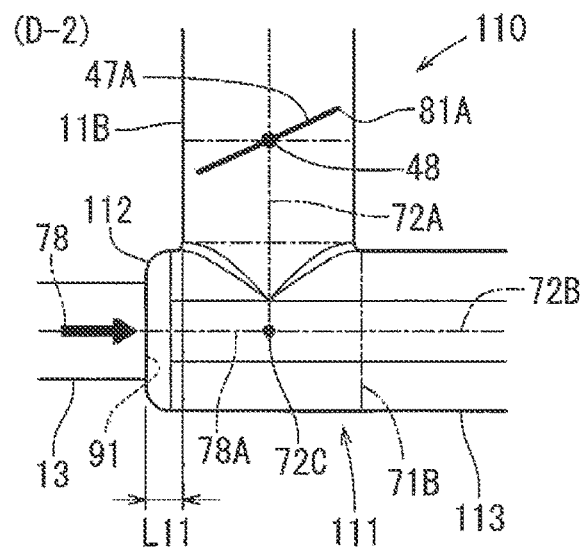

Hereinafter, one example of CAE (Computer Aided Engineering) analysis results of the "variation in EGR gas volume among cylinders (%)" for a connection structure 100 between the intake pipe 11B and the outlet side of the EGR pipe 13 according to a first comparative example will be described with reference to FIG. 14(C-1) and FIG. 16. FIG. 14(C-1) is a view illustrating the connecting structure 100 between the intake pipe 11B and the outlet side of the EGR pipe 13 according to the first comparative example. "C-1" in FIG. 16 represents the CAE analysis result of the variation in EGR gas volume among the cylinders when the throttle valve 47A of the connection structure 100 is rotated in the direction illustrated in FIG. 14(C-1). In the following description, the same reference numerals used for the structures, etc., of the connection structure 90 according to the first comparative example represent the substantially the same or equivalent parts as those of the connection structure 90 according to the second embodiment.

As FIG. 14(C-1) shows, the connection structure 100 between the intake pipe 11B and the outlet side of the EGR pipe 13 is substantially the same as the connection structure 90 between the intake pipe 11B and the outlet side of the EGR pipe 13 shown in FIG. 13(B-2). However, instead of the bent section 71, a bent section 101 is provided. Although the bent section 101 has substantially the same design as the bent section 71, an outer surface facing the intake gas outlet 71B is bulged outward in the axis direction of the outlet side intake pipe axis 72B (to the left in FIG. 14(C-1)). This outer facing surface is bulged by a depth L11 (e.g., a depth of about 10 mm to 20 mm) so as to have a cylindrical bulged section 102 with a bottom.

Further, the EGR pipe 13 connected to the bulged section 102 is provided such that the extension line 78A of the EGR pipe axis 78 passing through the connection port 91 of the EGR pipe 13 is coaxial with the outlet side intake pipe axis 72B passing through the intake gas outlet 71B. Further, the inner facing portion 81A of the throttle valve 47A facing the inside the bent section 101 is rotated about the rotation shaft 48 from the closed position, which is orthogonal to the inlet side intake pipe axis 72A, toward the downstream side by a predetermined angle θ1 (e.g., about 20 degrees).

With the connection structure 100 as configured above, the "variation in EGR gas volume among cylinders (%)" was "X3" (%) (where X3>X2) as shown as "C-1" in FIG. 16. At this level, fluctuations in combustion noise in each of the cylinders 45A to 45D was substantially at the upper limit of the variation in EGR gas volume among cylinders at which the driver will not have an unpleasant impression. In other words, the variation in EGR gas volume among each of the cylinders 45A to 45D of the connection structure 100 shown in FIG. 14(C-1) was greater than the variation in EGR gas volume among each of the cylinders 45A to 45D of the connection structure 90 shown in FIG. 13(B-2).

It is believed that the mixing of the EGR gas with the intake gas will be slightly reduce with the connection structure 100 due to the intake gas colliding against the bulge section 102 of the bent section. It is believe that this causes the flow flowing upstream in a swirling manner to be reduced. As a result, it is believe that it increases difference in magnitude between the two vortex currents 87A, 87B (see FIG. 12) flowing in a swirling manner downstream from the intake gas outlet 71B. Therefore, it is believed that with a connection structure 100 having a cylindrical bulge section 102 with a bottom that bulges outward in the intake pipe axis direction by the depth L11 on the outer surface of the bent section 101 facing the intake gas outlet 71B, fluctuations in combustion noise in each of the cylinders 45A to 45D may possibly give an unpleasant impression to the driver.

SECOND COMPARATIVE EXAMPLE

Figure 15:
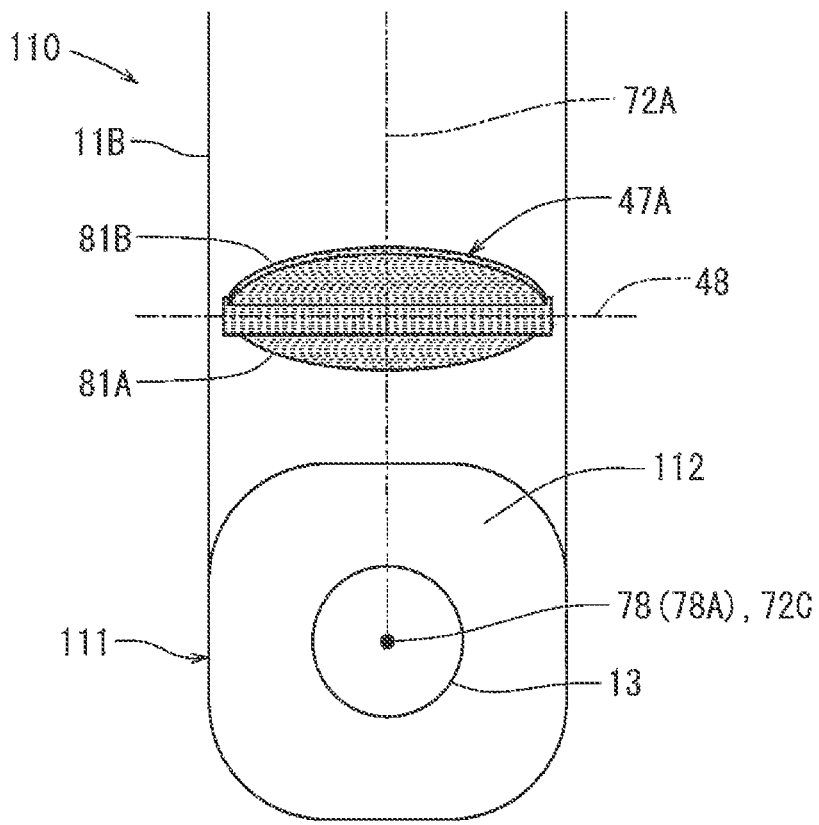
FIG. 15 is a view as seen from an arrow XV in FIG. 14(D1).

Hereinafter, one example of CAE (Computer Aided Engineering) analysis results of the "variation in EGR gas volume among cylinders (%)" for a connection structure 110 between the intake pipe 11B and the outlet side of the EGR pipe 13 according to a second comparative example will be described with reference to FIG. 14(D-1), FIG. 14(D-2), FIG. 15, and FIG. 16. FIG. 14(D-1) and FIG. 14(D-2) are views illustrating the connecting structure 110 between the intake pipe 11B and the outlet side of the EGR pipe 13 according to the second comparative example. FIG. 15 is a view as seen from an arrow XV in FIG. 14(D-1).

"D-1" in FIG. 16 represents the CAE analysis result of the "variation in EGR gas volume among the cylinders (%)" when the throttle valve 47A of the connection structure 110 illustrated in FIG. 14(D-1) is rotated. "D-2" in FIG. 16 represents the CAE analysis result of the "variation in EGR gas volume among the cylinders (%)" when the throttle valve 47A of the connection structure 110 illustrated in FIG. 14(D-2) is rotated. Besides, in the following description, the same reference numerals used for the structures, etc., of the connection structure 100 according to the first comparative example represent substantially the same or corresponding parts as those of the connection structure 100 according to the first comparative example.

As FIG. 14(D-1) and FIG. 15 show, the connection structure 110 between the intake pipe 11B and the outlet side of the EGR pipe 13 is substantially the same as the connection structure 100 between the intake pipe 11B and the outlet side of the EGR pipe 13 shown in FIG. 14(C-1). However, it is different in that a bent section 111 is provided instead of the bent section 101 and an intake pipe 113 is provided instead of the intake pipe 11B downstream of the bent section 101. More specifically, the bent section 111 and the intake pipe 113 are different in that cross-sections are formed to have substantially a rectangular shape, whose outside ends comes in contact with a round pipe having a pipe diameter D1 (see FIG. 9). Therefore, the bent section 111 is provided with a square cylindrical bulge section 112 having a bottom with an outer surface facing the intake gas outlet 71B, instead of the bulge section 102 of the first comparative example. The bulge section 112 is bulged outward in the axis direction of the outlet side intake pipe axis 72B by a depth L11 (e.g., a depth of about 10 mm to 20 mm).

Further, the EGR pipe 13 connected to the bulged section 112, is provided such that the extension line 78A of the EGR pipe axis 78 passing through the connection port 91 of the EGR pipe 13 is coaxial with the outlet side intake pipe axis 72B passing through the intake gas outlet 71B. Further, the inner facing portion 81A of the throttle valve 47A shown in FIG. 14(D-1) facing the inside the bent section 111 is rotated about the rotation shaft 48 from the closed position, the closed position being orthogonal to the inlet side intake pipe axis 72A, toward the downstream side by a predetermined angle θ1 (e.g., about 20 degrees).

With the connection structure 110 as configured above, the "variation in EGR gas volume among cylinders (%)" was "X4" (%) (where X4>X3×1.3) as shown as "D-1" in FIG. 16. This indicates that fluctuations in combustion noise in each of the cylinders 45A to 45D was at a level at which the driver will have an unpleasant impression.

Further, in the connection structure 110 as shown in FIG. 14(D-2), the inner facing portion 81A of the throttle valve 47A facing the inside the bent section 111 is rotated about the rotation shaft 48 from the closed position, the closed position being orthogonal to the inlet side intake pipe axis 72A, toward the upstream side by a predetermined angle θ1 (e.g., about 20 degrees). As a result, with the connection structure 110 as configured above, the "variation in EGR gas volume among cylinders (%)" was "X5" (%) (where X5>X4×1.3) as shown as "D-2" in FIG. 16. This indicates that fluctuations in combustion noise in each of the cylinders 45A to 45D was at a level at which the driver will have a more unpleasant impression.

Therefore, it was discovered that when the bent section 111 and a cross-section of the intake pipe 113 downstream of the bent section 111 are configured to have substantially a rectangular shape, the mixing of the EGR gas with the intake gas may be reduced as compared to if the cross-section were to be configured to have a circular shape. As a result, it was discovered that a rectangular shape leads to increased fluctuations in combustion noise in each of the cylinders 45A to 45D. Further, it was discovered that the mixing of the EGR gas with the intake gas may be reduced and fluctuations in combustion noise of each of the cylinders 45A to 45D may be greater when the inner facing portion 81A side of the throttle valve 47A is rotated about the rotation shaft 48 from the closed position toward the upstream side by a predetermined angle θ1 (e.g., about 20 degrees).

Nevertheless, the present disclosure shall not be limited to the first embodiment and the second embodiment. Various improvements, modifications, additions, and deletions may be certainly made without departing from the scope of the disclosure. For example, the following may be possible. In the following description, the same reference numerals as those of the internal combustion engine 10, etc. according to the first embodiment in FIG. 1 to FIG. 8 above indicate substantially the same or equivalent parts to those of the internal combustion engine 10, etc. according to the first embodiment.

(A) For example, as shown in FIG. 4, the EGR pipe 13 is connected to the left sidewall of the bent section 71 downward from the outer curved surface 73C. However, it may also be connected to the right sidewall of the bent section 71 downward from the outer curved surface 73C. This allows the EGR gas to flow substantially evenly into the intake gas that forms the two vortex currents 87A, 87B (see FIG. 6). This results in substantially constant combustions in each of the cylinders 45A to 45D, thereby suppressing fluctuations in combustion noise.

(B) Further, for example, the outlet side of the EGR pipe 13 may be connected at any locations arranged on the side of the second plane 79 opposite to the intake gas inlet 74A (see FIG. 10) in a direction between the location at the connection port 77 shown in FIG. 3 on the side wall of the bent section 71 and the location at the connection port 91 shown in FIG. 9. Further, the outlet side of the EGR pipe 13 may also be connected at any locations arranged on the side of the second plane 79 opposite the intake gas inlet 71A (see FIG. 10) in a direction between the location on the side of the first plane of the connection port 77 shown in FIG. 3 at the bent section 71 on the sidewall of the bent section 71 and the location at the connection port 91 shown in FIG. 9. This allows the EGR gas to flow substantially evenly into the intake gas that forms the two vortex currents 87A, 87B (see FIG. 6). This results in substantially constant combustions in each of the cylinders 45A to 45D, thereby suppressing fluctuations in combustion noise.

(C) The values adopted for describing the first embodiment and the second embodiment are only given by way of example, and should not be construed restrictively. Further, greater than or equal to (≥), less than or equal to (≤), greater than (>), and less than (<) may or may not include an equal sign.

The invention claimed is:

1. An internal combustion engine, comprising:
   an intake pipe having a bent section and an intake gas outlet downstream of the bent section, the intake gas outlet being connected to an upstream side of an intake manifold;
   a throttle valve configured to adjust an opening of the intake pipe, the throttle valve being disposed upstream of an intake gas inlet that is upstream of the bent section;
   an exhaust gas recirculation (EGR) pipe connected to the bent section, wherein:
   a rotation shaft of the throttle valve is provided so as to be perpendicular to a first plane, the first plane including an inlet side intake pipe axis passing through the intake gas inlet and an outlet side intake pipe axis passing through the intake gas outlet, and
   an outer surface of the bent section that is intersected by the first plane includes:
      an outer curved surface,
      a first sidewall surface extending, in parallel to the inlet side intake pipe axis, from an outer end of the intake gas inlet toward an outer curved surface of the bent section, and
      a second sidewall surface extending, in parallel to the outlet side intake pipe axis, from an outer end of the intake gas outlet toward the outer curved surface of the bent section,
   wherein the outer curved surface of the bent section has a predetermined radius of curvature and is configured to connect the first sidewall surface and the second side wall surface wherein:
   an inner facing portion of the throttle valve faces an inside of the bent section and is configured to be rotated from a closed position, at which the throttle valve is orthogonal to the inlet side intake pipe axis of the intake gas inlet, about a rotation shaft toward a downstream side by an angle,
   an outer facing portion of the throttle valve faces an outside of the bent section and is configured to be rotated about the rotation shaft from the closed position, at which the throttle valve is orthogonal to the inlet side intake pipe axis of the intake gas inlet, toward an upstream side by an angle, and
   the throttle valve is configured to allow the intake gas to flow downstream through a gap between each of the side edges in a direction orthogonal to the rotation shaft of the throttle valve and to flow in the intake pipe.

2. The internal combustion engine according to claim 1, wherein the internal combustion engine is configured to allow the intake gas flowing through the gap between the outer facing portion of the throttle valve and the intake pipe to flow along the first sidewall surface.

3. The internal combustion engine according to claim 1, wherein:
   a second plane is orthogonal to the first plane and includes the outlet side intake pipe axis of the intake gas outlet,
   an extension line of an EGR pipe axis passing through a connection port of the EGR pipe is disposed substantially perpendicular to the first plane,
   the extension line of the EGR pipe axis is also disposed on a side of the second plane opposite to the intake gas inlet, and
   the extension line of the EGR pipe axis is located in a position closer to the outer curved surface of the bent section than an intersection between the inlet side intake pipe axis and the outlet side intake pipe axis.

4. The internal combustion engine according to claim 1, wherein:
   a second plane is orthogonal to the first plane and includes the outlet side intake pipe axis of the intake gas outlet,
   an extension line of an EGR pipe axis passing through a connection port of the EGR pipe is disposed in parallel to the outlet side intake pipe axis of the intake gas outlet at the bent section on the first plane, and
   the extension line of the EGR pipe axis is disposed on a side of the second plane opposite to the intake gas inlet.

5. The internal combustion engine according to claim 1, wherein the predetermined radius of curvature of the outer curved surface of the bent section continuously extends from the first sidewall surface to the second sidewall surface.

6. The internal combustion engine according to claim 1, wherein the predetermined radius of curvature of the outer curved surface of the bent section is constant between the first sidewall surface and the second sidewall surface.

7. The internal combustion engine according to claim 1, wherein the internal combustion engine is configured to allow a portion of the intake gas flowing through the gap between the outer facing portion of the throttle valve and the intake pipe to collide with the outer curved surface of the bent section.

8. The internal combustion engine according to claim 1, wherein the inlet side intake pipe axis passing through the intake gas inlet is perpendicular to the outlet side intake pipe axis passing through the intake gas outlet.

9. The internal combustion engine according to claim 1, wherein the inlet side intake pipe axis intersects the outlet side intake pipe axis within the bent section.

10. The internal combustion engine according to claim 1, wherein the inlet side intake pipe axis intersect the second sidewall surface.

11. The internal combustion engine according to claim 1, wherein the outlet side intake pipe axis intersects the first sidewall surface.

12. An internal combustion engine, comprising:
an intake pipe having a bent section and an intake gas outlet downstream of the bent section, the intake gas outlet being connected to an upstream side of an intake manifold;
a throttle valve configured to adjust an opening of the intake pipe, the throttle valve being disposed upstream of an intake gas inlet that is upstream of the bent section;
an exhaust gas recirculation (EGR) pipe connected to the bent section, wherein:
a rotation shaft of the throttle valve is provided so as to be perpendicular to a first plane, the first plane including an inlet side intake pipe axis passing through the intake gas inlet and an outlet side intake pipe axis passing through the intake gas outlet, and
an outer surface of the bent section that is intersected by the first plane includes:
an outer curved surface,
a first sidewall surface extending, in parallel to the inlet side intake pipe axis, from an outer end of the intake gas inlet toward an outer curved surface of the bent section, and
a second sidewall surface extending, in parallel to the outlet side intake pipe axis, from an outer end of the intake gas outlet toward the outer curved surface of the bent section,
wherein the outer curved surface of the bent section has a predetermined radius of curvature and is configured to connect the first sidewall surface and the second side wall surface, wherein:
the intake gas inlet of the intake pipe has a predetermined diameter, and
a ratio of the predetermined radius of curvature of the outer curved surface of the bent section to the predetermined diameter of the intake gas inlet of the intake pipe is less than or equal to 0.73.

13. An internal combustion engine, comprising:
an intake pipe having a bent section and an intake gas outlet downstream of the bent section, the intake gas outlet being connected to an upstream side of an intake manifold;
a throttle valve configured to adjust an opening of the intake pipe, the throttle valve being disposed upstream of an intake gas inlet that is upstream of the bent section;
an exhaust gas recirculation (EGR) pipe connected to the bent section, wherein:
a rotation shaft of the throttle valve is provided so as to be perpendicular to a first plane, the first plane including an inlet side intake pipe axis passing through the intake gas inlet and an outlet side intake pipe axis passing through the intake gas outlet, and
an outer surface of the bent section that is intersected by the first plane includes:
an outer curved surface,
a first sidewall surface extending, in parallel to the inlet side intake pipe axis, from an outer end of the intake gas inlet toward an outer curved surface of the bent section, and
a second sidewall surface extending, in parallel to the outlet side intake pipe axis, from an outer end of the intake gas outlet toward the outer curved surface of the bent section,
wherein the outer curved surface of the bent section has a predetermined radius of curvature and is configured to connect the first sidewall surface and the second side wall surface, wherein:
the throttle valve is configured to be rotated from a closed position, where it is positioned to be orthogonal to the inlet side intake pipe axis of the intake gas inlet, about a rotation shaft,
an inner facing portion of the throttle valve is configured to be positioned downstream of the rotation shaft after the throttle valve has been rotated,
an outer facing portion of the throttle valve is configured to be positioned upstream of the rotation shaft after the throttle valve has been rotated, and
a distance between the inner facing portion of the throttle valve and the intake gas outlet is less than a distance between the outer facing portion of the throttle valve and the intake gas outlet.

* * * * *